United States Patent
Takahashi

(10) Patent No.: US 10,021,731 B2
(45) Date of Patent: Jul. 10, 2018

(54) HOME INTERIOR MONITORING SYSTEM AND COMMUNICATION CONTROL METHOD

(71) Applicant: Panasonic Intellectual Property Management Co., Ltd., Osaka (JP)

(72) Inventor: Takeshi Takahashi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/448,933

(22) Filed: Mar. 3, 2017

(65) Prior Publication Data

US 2017/0279949 A1    Sep. 28, 2017

(30) Foreign Application Priority Data

Mar. 24, 2016 (JP) .................................. 2016-060970
Mar. 24, 2016 (JP) .................................. 2016-060971

(51) Int. Cl.
| | | |
|---|---|---|
| *H04W 76/14* | (2018.01) |
| *G08B 25/00* | (2006.01) |
| *G08B 25/08* | (2006.01) |
| *G08B 25/10* | (2006.01) |
| *G08B 25/14* | (2006.01) |
| *H04W 4/38* | (2018.01) |
| *G08B 13/196* | (2006.01) |
| *H04W 76/10* | (2018.01) |

(52) U.S. Cl.
CPC .......... *H04W 76/14* (2018.02); *G08B 25/004* (2013.01); *G08B 25/009* (2013.01); *G08B 25/08* (2013.01); *G08B 25/10* (2013.01); *G08B 25/14* (2013.01); *H04W 4/38* (2018.02); *G08B 13/1966* (2013.01); *G08B 13/19684* (2013.01); *H04W 76/10* (2018.02)

(58) Field of Classification Search
CPC ................................ H04W 76/14; H04W 4/38
See application file for complete search history.

(56) References Cited

U.S. PATENT DOCUMENTS

| | | | |
|---|---|---|---|
| 9,197,696 B1* | 11/2015 | Jakatdar | H04L 67/06 |
| 9,479,354 B2 | 10/2016 | Yamanishi et al. | |
| 2005/0201557 A1* | 9/2005 | Ishidoshiro | H04L 63/0492 380/44 |
| 2007/0136608 A1* | 6/2007 | Kirovski | G06Q 20/06 713/193 |
| 2008/0270619 A1* | 10/2008 | Davies | H04L 63/08 709/229 |

(Continued)

FOREIGN PATENT DOCUMENTS

JP    5845453 B1    1/2016

*Primary Examiner* — Mazda Sabouri
(74) *Attorney, Agent, or Firm* — Seed IP Law Group LLP

(57) ABSTRACT

A home interior monitoring system includes a master device that can wirelessly communicate with at least one electric device installed in an interior of a home and is not connected to the Internet, and a mobile phone terminal that can wirelessly communicate directly with the master device. The mobile phone terminal, in a case of launching an application, sets, to OFF, a connection invalidity flag that invalidates wireless connection to an access point that is not connected to the Internet. The master device outputs an electromagnetic wave for wireless connection with the mobile phone terminal.

10 Claims, 16 Drawing Sheets

(56) References Cited

U.S. PATENT DOCUMENTS

| | | | |
|---|---|---|---|
| 2014/0245015 A1* | 8/2014 | Velamoor | H04L 63/061 |
| | | | 713/171 |
| 2015/0156538 A1* | 6/2015 | Godbole | H04N 21/4334 |
| | | | 725/83 |
| 2016/0149722 A1 | 5/2016 | Yamanishi et al. | |
| 2016/0262095 A1* | 9/2016 | Sakamoto | H04W 48/18 |
| 2017/0013184 A1 | 1/2017 | Yamanishi et al. | |

* cited by examiner

HOME INTERIOR MONITORING SYSTEM AND COMMUNICATION CONTROL METHOD

BACKGROUND

1. Technical Field

The present disclosure relates to a home interior monitoring system and a communication control method.

2. Description of the Related Art

In recent years, there has been known a monitoring camera system (for example, refer to Japanese Patent No. 5845453) that includes a monitoring camera, a master device of a fixed phone that is connected to a fixed phone network and can communicate with another fixed phone, and a smartphone that can wirelessly communicate with the master device through a wireless router and wirelessly connects with another mobile phone through a mobile phone network (for example, 3G or 4G).

In the monitoring camera system of Japanese Patent No. 5845453, the smartphone, in the case of a wireless router not being registered in the master device, displays a screen prompting a predetermined operation to be performed on the master device and waits for a signal from the master device. The master device directly and wirelessly connects with the smartphone by the predetermined operation and sends a setting request signal to the smartphone. The smartphone, when receiving the setting request signal, wirelessly connects with a wireless router to acquire router setting information from the wireless router and wirelessly connects with the master device to send the router setting information to the master device. The master device registers the wireless router based on the router setting information. Accordingly, when an instruction operation that causes, for example, the smartphone to display an image is performed, the master device receives information as to the instruction operation from the smartphone through the wireless router and can send image data transferred from the monitoring camera to the smartphone through the wireless router.

In the monitoring camera system in the related art, data cannot be sent and received between the master device and the smartphone without the wireless router, and convenience is not sufficient. If the master device, instead of the wireless router that can connect to the Internet, operates as an access point (AP) that cannot connect to the Internet, the smartphone is expected to have difficulty in continuing connection with the master device.

SUMMARY

The present disclosure is conceived in view of the above matter and provides a home interior monitoring system and a communication control method that can improve convenience of a user related to communication between a master device of a fixed phone and a smartphone without passing through a wireless router and that can continue wireless connection between the smartphone and the master device.

According to an aspect of the present disclosure, there is provided a home interior monitoring system including a master device that can wirelessly communicate with at least one electric device installed in an interior of a home and is not connected to the Internet, and a mobile phone terminal that can wirelessly communicate directly with the master device. The mobile phone terminal, in a case of launching an application, sets, to OFF, a connection invalidity flag that invalidates wireless connection to an access point that is not connected to the Internet. The master device outputs an electromagnetic wave for wireless connection with the mobile phone terminal.

According to the present disclosure, convenience of a user related to communication between a master device of a fixed phone and a smartphone can be improved without passing through a wireless router, and wireless connection between the smartphone and the master device can be continued.

DETAILED DESCRIPTION

Figure 1:
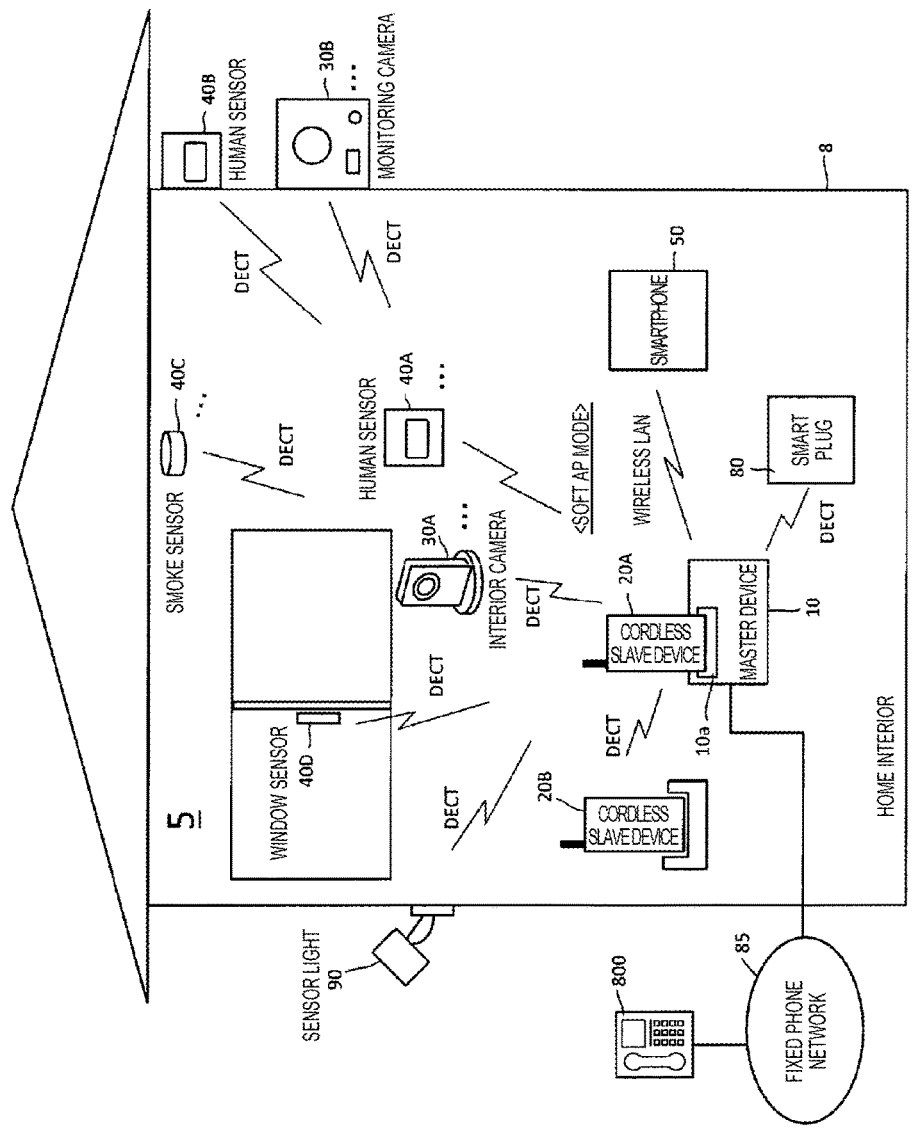
FIG. 1 is a diagram illustrating one example of a system configuration of a home interior monitoring system of each exemplary embodiment in a state where a master device and a smartphone are connected in a soft AP mode.

Hereinafter, an exemplary embodiment will be described in detail with appropriate reference to the drawings. Unnecessarily detailed description may be omitted. For example, detailed description of a previously well-known matter or duplicate description of substantially the same configuration may be omitted. This is to avoid the following description becoming unnecessarily redundant and to facilitate understanding for those skilled in the art. The appended drawings and the following description are provided in order for those skilled in the art to sufficiently understand the present disclosure and are not intended to limit the subject matter disclosed in the claims.

Background of One Exemplary Embodiment of Present Disclosure

In Japanese Patent No. 5845453, disclosed is the master device directly communicating with the smartphone in the case of a wireless router not being registered in the master device, by temporarily using the master device as an access point of a wireless local area network (LAN) in order to register a wireless router in the master device.

The configuration of Japanese Patent No. 5845453 assumes that after a wireless router is actually registered in the master device, data (for example, the image data from the monitoring camera) is sent and received between the master device and the smartphone through the wireless router. Thus, after the image data from the monitoring camera is transferred to the master device, the master device can transfer the image data to the smartphone through the wireless router, but the master device cannot directly communicate with the smartphone and transfer the image data. In other words, when a wireless router is registered in the master device in the monitoring camera system of Japanese Patent No. 5845453, data cannot be sent and received between the master device and the smartphone without the wireless router in actual operation, and thus convenience is not sufficient.

Typically, the wireless router can connect to the Internet. Assume that the wireless router is not disposed and that the master device, instead of the wireless router, has a function of an access point (AP) that cannot connect to the Internet. In this case, if the smartphone is connected to the master device by using a wireless LAN or the like, the smartphone is expected to start searching for another AP or a mobile line that can connect to the Internet, according to setting or a function of the smartphone. Thus, the smartphone is expected to have difficulty in continuing wireless connection with the master device.

Generally, the smartphone, when detecting an electromagnetic wave of a wireless LAN that is previously registered (initial setting is previously completed), automatically connects to the wireless LAN of the electromagnetic wave according to a model or setting.

In this case, the smartphone, when detecting an electromagnetic wave of a wireless LAN of the master device, makes wireless connection by using the wireless LAN and thus cannot use the Internet. Therefore, when the smartphone unnecessarily continues wireless connection to the master device in the case of not requiring a function of the master device (for example, a home interior monitoring function), a state incapable of using the Internet is expected to continue. Thus, the smartphone is expected to have difficulty in realizing a function (for example, browsing) through the Internet.

Hereinafter, a home interior monitoring system and a communication control method that can improve convenience of a user related to communication between a master device of a fixed phone and a smartphone without passing through a wireless router and that can continue connection between the smartphone and the master device will be described.

In addition, a home interior monitoring system and a communication control method that can reduce a state of the smartphone incapable of using the Internet will be described.

The following exemplary embodiment is not limited to the home interior monitoring system and can also be represented as a communication control method related to communication between a master device and a smartphone in the home interior monitoring system and can also be defined as a device category of the master device or the smartphone included in the home interior monitoring system.

Definition of Terms

In each exemplary embodiment below, a mode of wireless communication in which the smartphone constituting the home interior monitoring system, when wirelessly communicating with the master device of a fixed phone constituting the home interior monitoring system, wirelessly connects and wirelessly communicates with the master device through a wireless router is referred to as a "router connection mode". Similarly, a mode of wireless communication in which the smartphone, when wirelessly communicating with the master device of the fixed phone, wirelessly connects and wirelessly communicates with the master device as an access point (AP) of a wireless local area network (LAN) is referred to as a "soft AP mode". The soft AP mode can directly connect the master device and the smartphone and thus is also referred to as a direct connection mode. A human being who resides in a home where the home interior monitoring system is installed is referred to as a "user" for convenience.

The home interior monitoring system of each exemplary embodiment below is not limited to being installed in a private home and may also be installed in a commercial facility such as an office, a factory, or a store or in a public facility such as a city hall or a library. In this case, any human being who works in each facility may be a user.

First Exemplary Embodiment

Figure 2:
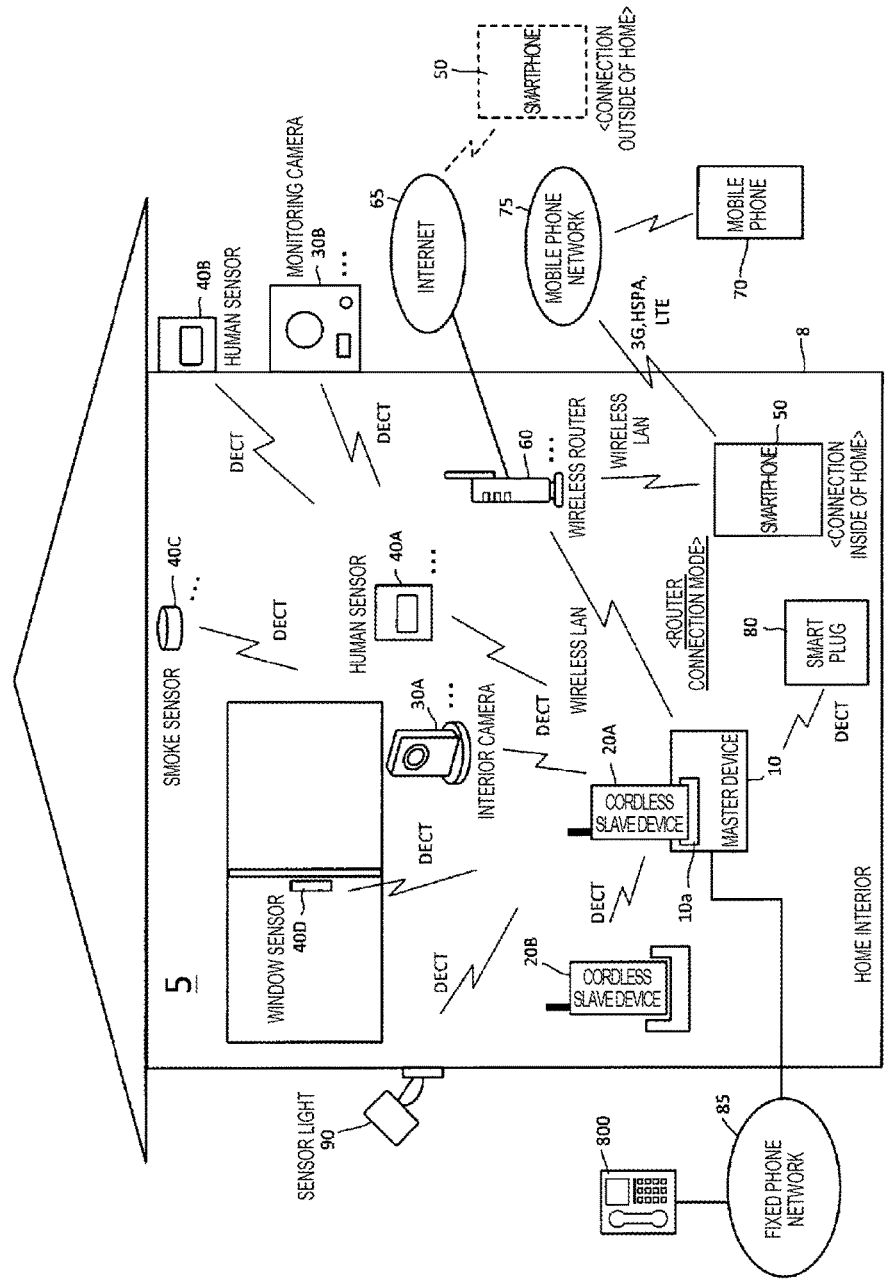
FIG. 2 is a diagram illustrating one example of a system configuration of the home interior monitoring system of each exemplary embodiment in a state where the master device and the smartphone are connected in a router connection mode.

FIG. 1 is a diagram illustrating one example of a system configuration of home interior monitoring system 5 in a state where master device 10 and smartphone 50 are connected in the soft AP mode. FIG. 2 is a diagram illustrating one example of a system configuration of home interior monitoring system 5 in a state where master device 10 and smartphone 50 are connected in router connection mode.

Home interior monitoring system 5 illustrated in FIG. 1 is installed in, for example, home interior 8 and is configured to include at least master device 10 of a fixed phone, two cordless slave devices 20A and 20B, two cameras 30 (for example, interior camera 30A and monitoring camera 30B), various sensors 40 (for example, human sensors 40A and 40B, smoke sensor 40C, and window sensor 40D), smart plug 80, sensor light 90, and smartphone 50. Various electric devices constituting home interior monitoring system 5 are examples and can be changed in various manners. For example, electric devices constituting home interior monitoring system 5 may include a home appliance, such as a refrigerator, a microwave, or an air conditioner, that can wirelessly communicate (for example, wirelessly communicate by using the DECT wireless communication scheme described later) with master device 10.

Home interior monitoring system 5 illustrated in FIG. 2 is configured to further include wireless router 60 in addition to the constituent devices of the home interior monitoring system illustrated in FIG. 1. Home interior monitoring system 5 illustrated in FIG. 1 may also have wireless router 60. Wireless router 60 is not illustrated in FIG. 1 because wireless router 60 is not required in the soft AP mode.

Hereinafter, the constituent devices of home interior monitoring system 5 will be described in order.

Master device 10 acts as a gateway related to communication with various constituent devices of home interior monitoring system 5. That is, master device 10 is a control device that controls overall operation of home interior monitoring system 5, and wirelessly connects with cordless slave devices 20A and 20B, cameras 30, sensors 40, smart plug 80, sensor light 90, and the like in a wirelessly communicable manner by using, for example, the digital enhanced cordless telecommunications (DECT) wireless communication scheme.

When initial setting for use of the soft AP mode described later is finished, master device 10 operates as an access point of a wireless LAN in the soft AP mode and thus can wirelessly communicate directly with smartphone 50 without passing through wireless router 60. As illustrated in FIG. 1, master device 10 cannot connect to Internet 65 in the soft AP mode. Thus, smartphone 50 cannot connect to master device 10 when the user is outside of the home (that is, outside of a wireless communication range between smartphone 50 and master device 10 as an access point).

When initial setting for use of the router connection mode described later is finished, master device 10 in the router connection mode operates as a communication terminal that uses the wireless LAN. Thus, master device 10 can connect to an external network (for example, Internet 65) through wireless router 60 (refer to FIG. 2) that uses the wireless LAN, and furthermore can wirelessly communicate with smartphone 50.

Master device 10 is connected to fixed phone network 85 in a wired manner and performs a mediation process for enabling a call between cordless slave devices 20A and 20B and another fixed phone 800. A call may be directly made between master device 10 and another fixed phone 800. Master device 10 has a function of recharging cordless slave device 20A inserted in insertion port 10a.

Cordless slave devices 20A and 20B are wirelessly connected with master device 10 by using the DECT wireless communication scheme and can wirelessly communicate (includes a call) with master device 10. Hereinafter, two cordless slave devices 20A and 20B will be collectively referred to as cordless slave device 20 in the case of distinction therebetween not being required.

Various sensors 40 (for example, human sensors 40A and 40B, smoke sensor 40C, and window sensor 40D) wirelessly connect with master device 10 by using the DECT wireless communication scheme. In FIG. 1 and FIG. 2, for example, window sensor 40D that detects opening and closing of a window, smoke sensor 40C that senses smoke, and human sensors 40A and 40B that sense a human being by using an infrared ray are used as sensors. Hereinafter, these types of sensors will be collectively referred to as sensor 40 in the case of distinction therebetween not being required. As described later, infrared sensor 313 (refer to FIG. 5) that is incorporated in camera 30 is also used as a human sensor.

Two cameras (for example, interior camera 30A and monitoring camera 30B) have a calling function and wirelessly connect with master device 10 by using the DECT wireless communication scheme. A call can be made between the two cameras and cordless slave devices 20A and 20B. In FIG. 1 and FIG. 2, monitoring camera 30B that images the outside of the home and interior camera 30A that images home interior 8 are used as cameras. Hereinafter, types of cameras will be collectively referred to as camera 30 in the case of distinction therebetween not being required.

Smart plug 80 has a wireless communicating function using DECT and is wirelessly connected with master device 10 by using the DECT wireless communication scheme. Smart plug 80, in accordance with an instruction sent from master device 10, switches conduction and blocking of a commercial alternating current power source or direct current power source that supplies power to various electric devices connected to smart plug 80 (for example, an air conditioner, a home appliance, an illumination, camera 30, or sensor 40). Details of smart plug 80 will be described later.

Sensor light 90 detects a motion of a human being in a monitored area (for example, the interior of the home of the user, a garden in the site of the home, or a front door) and is turned on to illuminate the surrounding area of the monitored area when the surrounding area is dark at night or the like. Luminance of sensor light 90 may be high to an extent that sensor light 90 can brightly illuminate the monitored area, or may be low to an extent that sensor light 90 is used as a warning lamp. Sensor light 90 has a wireless communicating function using DECT and is wirelessly connected with master device 10 by using the DECT wireless communication scheme. In sensor light 90, any of operating conditions of sensor light 90 can be set from smartphone 50 through master device 10. Details of sensor light 90 will be described later.

Sensor light 90 is not limited to being used for crime prevention in the site of the home of the user and apparently may be used for crime prevention in any of business places such as a store, a factory, and an office. A sensor light may not be used for crime prevention and may be used for improving convenience of a human who visits a location of installation thereof.

Smartphone 50 as a mobile phone terminal can wirelessly connect and wirelessly communicate with another mobile phone 70, another smartphone (not illustrated), or the like through mobile phone network 75 that uses various wireless communication schemes such as third generation (3G), high speed packet access (HSPA), and long term evolution (LTE).

When initial setting for use of the soft AP mode described later is finished, smartphone 50 can wirelessly communicate directly with master device 10 as an access point of the wireless LAN without passing through wireless router 60 in the soft AP mode.

When initial setting for use of the router connection mode described later is finished, smartphone 50 in the router connection mode can wirelessly connect and wirelessly communicate with master device 10 through wireless router 60 (refer to FIG. 2) that uses the wireless LAN.

Internal Configuration of Constituent Device of Home Interior Monitoring System 5

Figure 3:
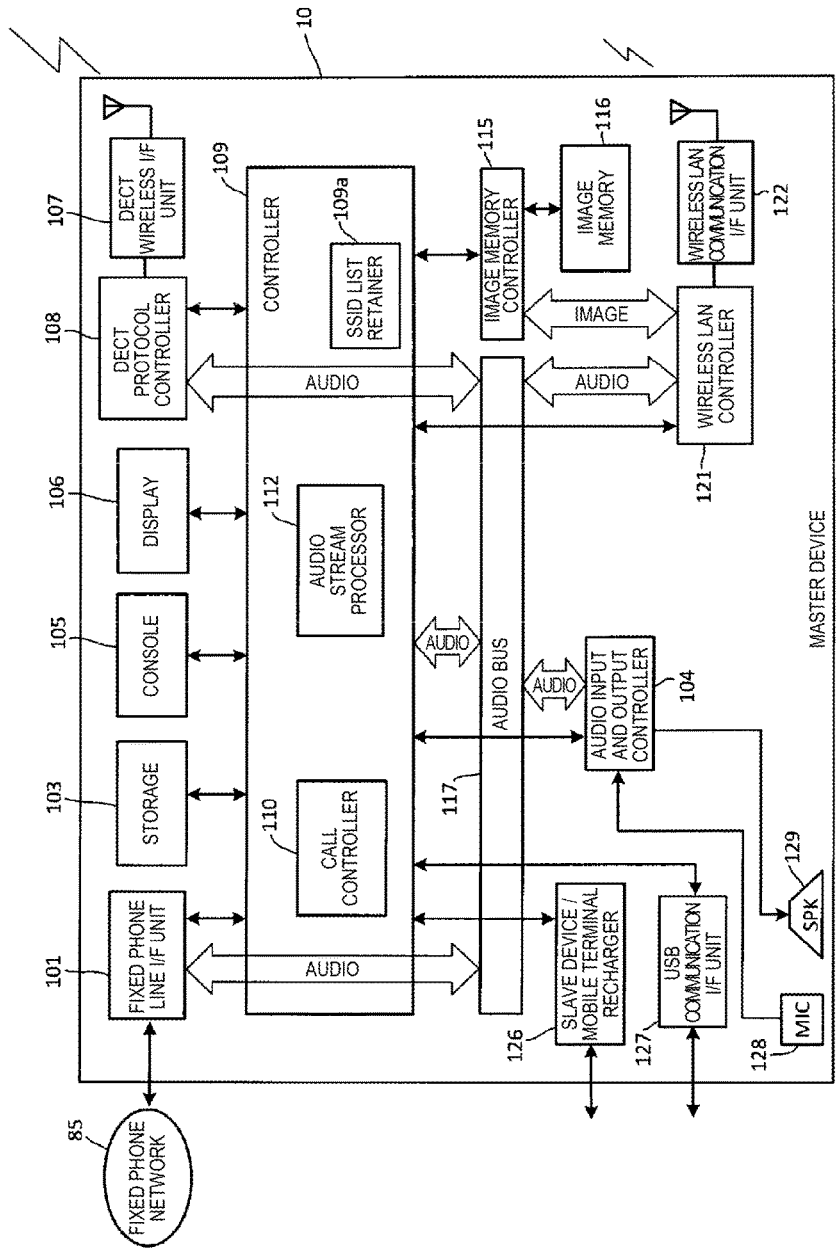
FIG. 3 is a block diagram illustrating one example of an internal configuration of the master device in the home interior monitoring system.

FIG. 3 is a block diagram illustrating one example of an internal configuration of master device 10 in home interior monitoring system 5. Master device 10 is configured to include controller 109, storage 103, console 105, and display 106. Master device 10 receives various input operations and displays information such as an image on display 106. Console 105 of master device 10 has a setup button that is pressed by the user in order to output an electromagnetic wave of the wireless LAN described later. Master device 10 may have, as one example of display 106, a light emitting diode (LED) for indicating the status of output of the electromagnetic wave of the wireless LAN.

Controller 109 has call controller 110 and audio stream processor 112 and, for example, controls a call or processes audio data.

Controller 109 further has SSID list retainer 109a. SSID list retainer 109a retains a service set identifier (SSID) as identification information of wireless router 60 (that is, an access point) in wireless communication of master device 10 using the wireless LAN. SSID list retainer 109a retains at least one SSID recognized by master device 10. That is, while one wireless router 60 is in FIG. 2, wireless router 60 may be in plural numbers. In this case, SSID list retainer 109a retains a plurality of different SSIDs. SSID list retainer 109a retains an SSID as identification information in the case of master device 10 being an access point of wireless communication that uses the wireless LAN.

Display 106 may be configured by using a touch panel. Display 106 corresponding to a touch panel receives and outputs a user operation to controller 109 and displays display data passed from controller 109.

Master device 10 has image memory controller 115 and image memory 116 and receives and stores image data or the like imaged by camera 30 or transferred from camera 30 in image memory 116.

Master device 10 has wireless LAN controller 121 and wireless LAN communication I/F unit 122 and sends and receives image data and audio data with smartphone 50, camera 30, or the like through or without passing through wireless router 60 by using the wireless LAN.

When initial setting for use of the soft AP mode described later is finished, master device 10 operates as an access point of the wireless LAN in the soft AP mode and wirelessly communicates directly with smartphone 50. When image data is transferred from camera 30 that is wirelessly connected by using, for example, DECT, master device 10 can send the image data to smartphone 50.

When initial setting for use of the router connection mode described later is finished, master device 10 in the router connection mode wirelessly communicates with smartphone 50 through wireless router 60 that uses the wireless LAN. When sensor detection result data (for example, information indicating that an intruder is detected) is transferred from sensor 40 that is wirelessly connected by using, for example, DECT, master device 10 can send the sensor detection result data to smartphone 50.

Master device 10 has DECT protocol controller 108 and DECT wireless IT unit 107 and wirelessly connects and wirelessly communicates with each of cordless slave device 20, sensor 40, camera 30, smart plug 80, and sensor light 90 by using the digital enhanced cordless telecommunications (DECT) wireless communication scheme.

Master device 10 has audio bus 117, audio input and output controller 104, loudspeaker 129, and microphone 128 and inputs and outputs audio to an external unit.

Master device 10 has fixed phone line IT unit 101 and allows a communication or a call with external fixed phone 800 that is connected to fixed phone network 85. As described above, master device 10 may control various types of processing of audio data at the time of a call in order to enable a call between external fixed phone 800 connected to fixed phone network 85 and cordless slave device 20.

Master device 10 has slave device/mobile terminal recharger 126 and recharges cordless slave device 20 or smartphone 50 inserted in insertion port 10a.

Master device 10 has USB communication I/F unit 127 and sends and receives data with a device, a memory, or the like having a Universal Serial Bus (USB) standard interface.

Master device 10 correlates various sensors 40 (for example, human sensors 40A and 40B, smoke sensor 40C, and window sensor 40D) with the plurality of cameras 30 and writes and registers the correlations in storage 103. For example, human sensor 40B and monitoring camera 30B are installed in close locations outside of the home and thus are registered in correlation with each other. As described later, monitoring camera 30B incorporates infrared sensor 313 (refer to FIG. 5), which is a human sensor, and thus is registered in correlation with infrared sensor 313. Any of human sensor 40A, smoke sensor 40C, and window sensor 40D is installed in home interior 8 and thus is registered in correlation with interior camera 30A.

Figure 4:
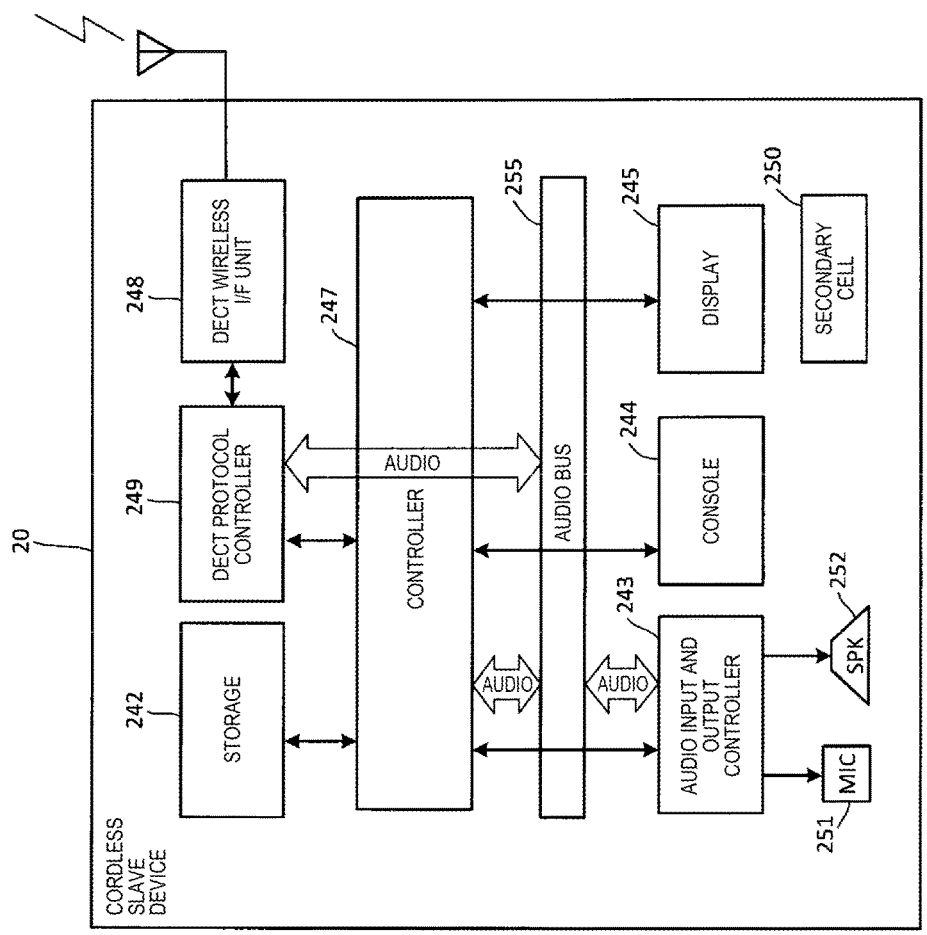
FIG. 4 is a block diagram illustrating one example of an internal configuration of a cordless slave device in the home interior monitoring system.

FIG. 4 is a block diagram illustrating one example of an internal configuration of cordless slave device 20 in home interior monitoring system 5. Cordless slave device 20 is configured to include controller 247, storage 242, console 244, and display 245. Cordless slave device 20 receives various input operations and displays information such as an image on display 245.

Cordless slave device 20 has DECT protocol controller 249 and DECT wireless I/F unit 248 and wirelessly connects and wirelessly communicates with each of master device 10, sensor 40, and camera 30 by using the DECT wireless communication scheme.

Cordless slave device 20 has audio bus 255, audio input and output controller 243, loudspeaker 252, and microphone 251 and inputs and outputs audio to an external unit (for example, external fixed phone 800) in a call.

Cordless slave device 20 supplies power required for operation to each unit of cordless slave device 20 by using secondary cell 250.

Figure 5:
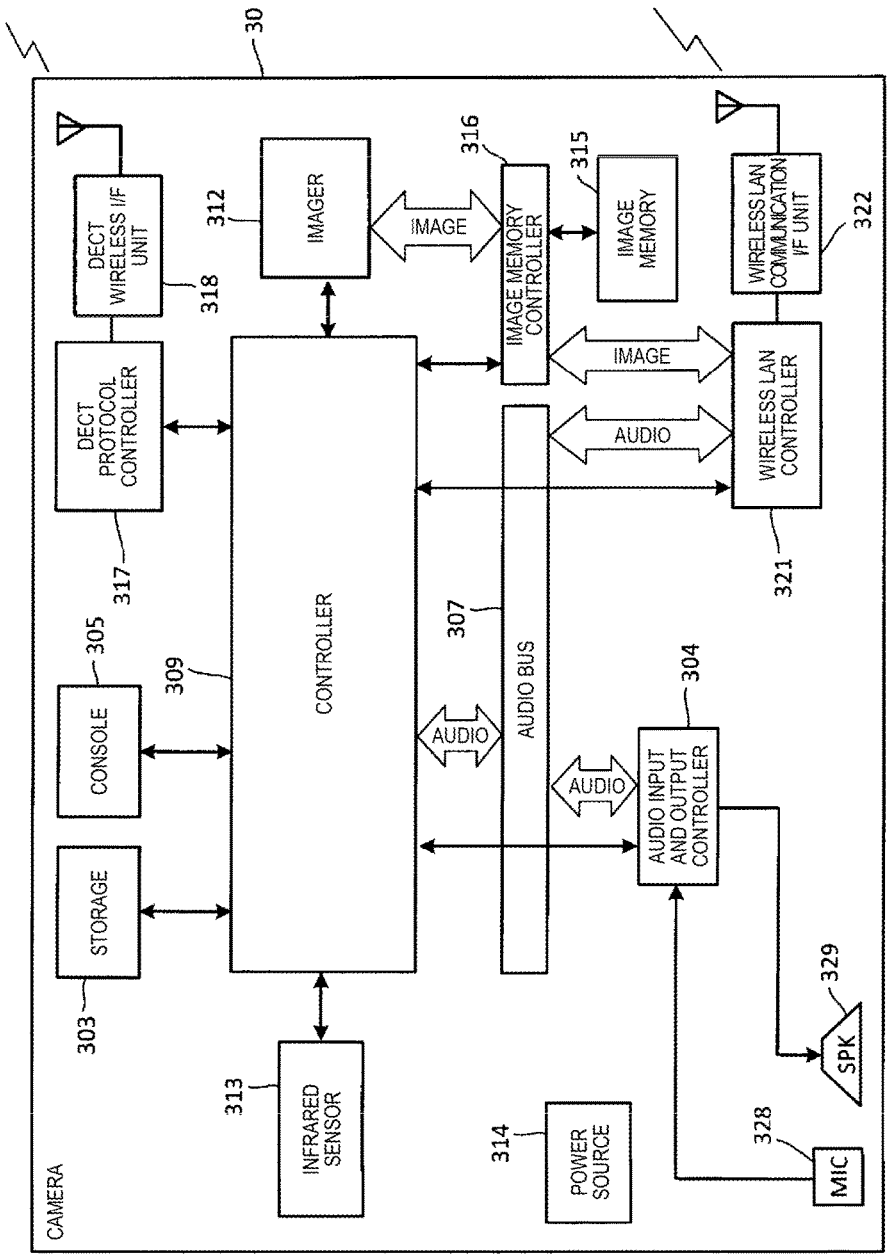
FIG. 5 is a block diagram illustrating one example of an internal configuration of a camera in the home interior monitoring system.

FIG. 5 is a block diagram illustrating one example of an internal configuration of camera 30 in home interior monitoring system 5. Interior camera 30A and monitoring camera 30B as one example of camera 30 have almost the same specifications. Camera 30 is configured to include controller 309, storage 303, and console 305. Camera 30 performs an operation related to imaging and receives input operations.

Camera 30 has DECT protocol controller 317 and DECT wireless I/F unit 318 and wirelessly connects and wirelessly communicates with master device 10 by using the DECT wireless communication scheme.

Camera 30 has wireless LAN controller 321 and wireless LAN communication I/F unit 322 and sends and receives image data and audio data with master device 10, smartphone 50, or the like through or without passing through wireless router 60 by using the wireless LAN.

Camera 30 has audio bus 307, audio input and output controller 304, loudspeaker 329, and microphone 328 and inputs and outputs audio to an external unit (for example, cordless slave device 20) in a call.

Camera 30 has imager 312, image memory controller 316, and image memory 315 and stores image data imaged by imager 312 in image memory 315. Imager 312 has a lens and an imaging element (an image sensor such as a charge coupled device (CCD) or a complementary metal oxide semiconductor (CMOS)).

Camera 30 incorporates, as a human sensor, infrared sensor (pyroelectric sensor) 313 that is a passive infrared (PIR) sensor. Infrared sensor 313 senses the presence of a human by detecting a change in heat (infrared ray) emitted by a human (human being). Camera 30 has power source 314 that is configured of, for example, a commercial alternating current power source or direct current power source.

Figure 6:
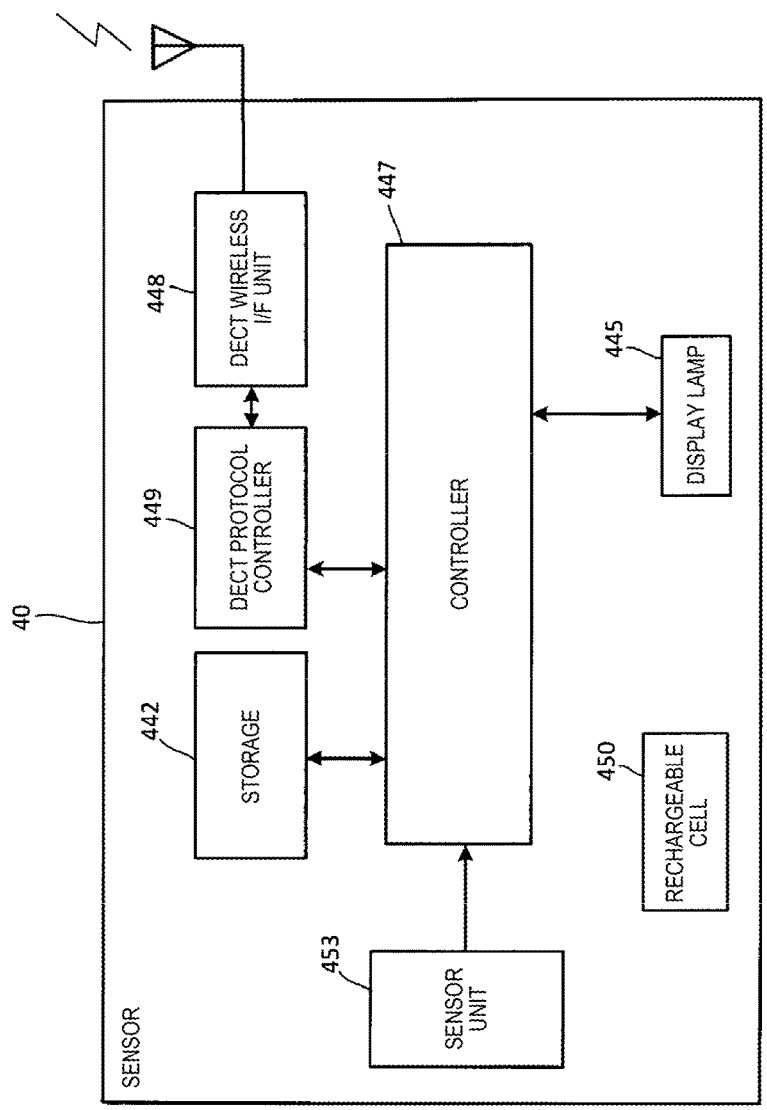
FIG. 6 is a block diagram illustrating one example of an internal configuration of a sensor in the home interior monitoring system.

FIG. 6 is a block diagram illustrating one example of an internal configuration of sensor 40 in home interior monitoring system 5. Sensor 40 is configured to include controller 447, storage 442, and display lamp 445. Sensor 40 performs a predetermined detecting operation such as turning on display lamp 445 in the case of detecting any event (for example, an intruder, a smoke, or opening or closing of a window).

Sensor 40 has DECT protocol controller 449 and DECT wireless I/F unit 448, wirelessly connects and wirelessly communicates with master device 10 by using the DECT wireless communication scheme, and sends sensor detection result data to master device 10 when detecting the above event.

Sensor unit 453 varies according to the type of sensor 40. For example, in the case of human sensors 40A and 40B, sensor unit 453 is a PIR sensor that senses a human by using a change in an infrared ray. In the case of window sensor 40D that detects opening and closing of a window or the like, sensor unit 453 is a reed switch that is switched to ON/OFF by opening and closing thereof. In the case of smoke sensor 40C, sensor unit 453 is a light emitter and a light receiver that sense a smoke by emitted light being blocked by a smoke.

Rechargeable cell 450 is a rechargeable cell and supplies a required amount of power to each unit of sensor 40.

Figure 7:
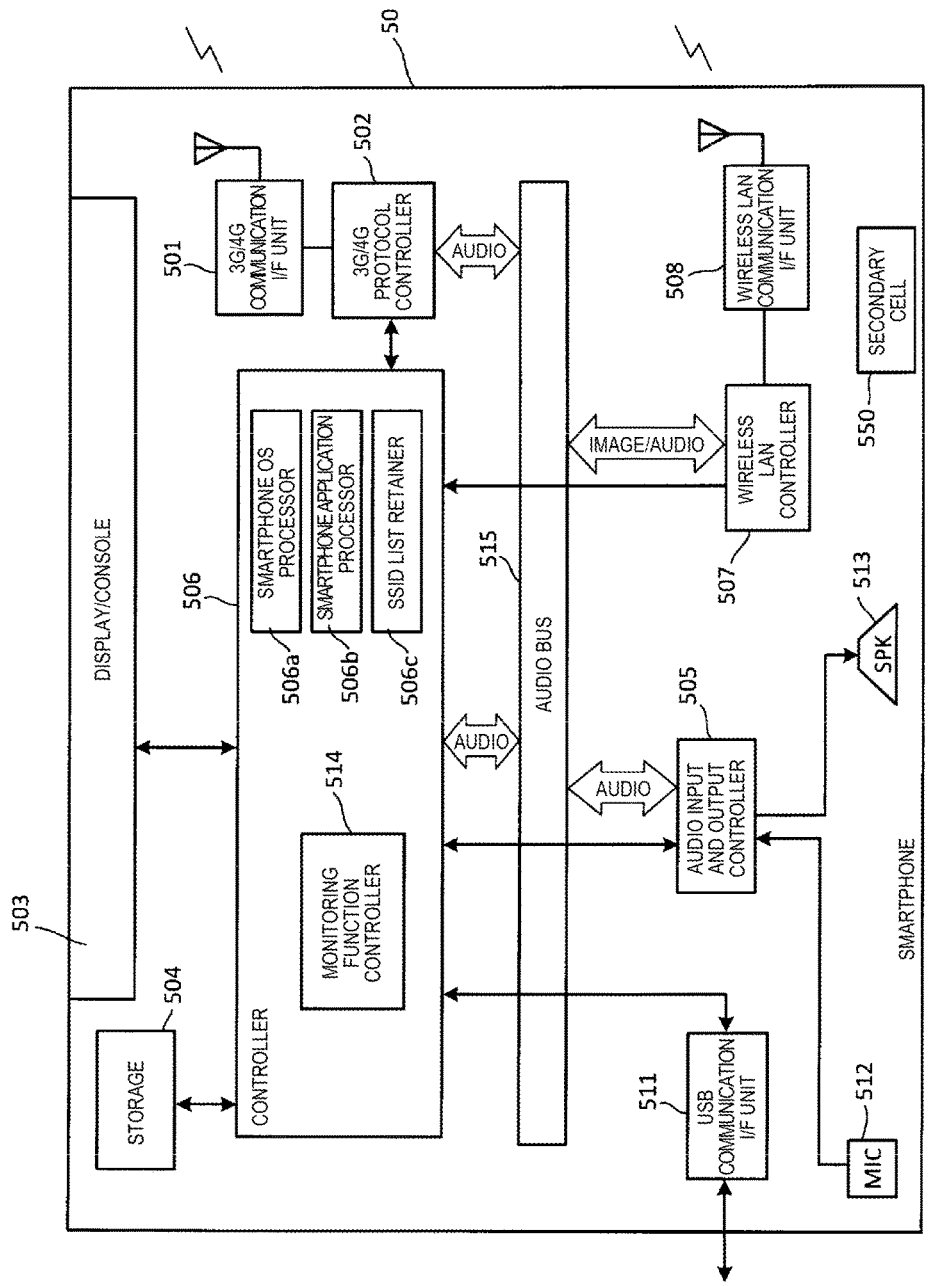
FIG. 7 is a block diagram illustrating one example of an internal configuration of the smartphone in the home interior monitoring system.

FIG. 7 is a block diagram illustrating one example of an internal configuration of smartphone 50 in home interior monitoring system 5. Smartphone 50 is configured to include controller 506, storage 504, and display/console (configured by using, for example, a touch panel) 503. Smartphone 50 receives various input operations and displays information such as an image on display/console 503.

Controller 506 incorporates monitoring function controller 514 that can set various types of setting information as to camera 30 or sensor light 90. Display/console 503 is a display input in which a display and an console are integrated, and displays information such as an image or an icon on a screen or displays a setting information generation screen (not illustrated) for sensor light 90, a detailed setting screen (refer to FIG. 11) for the wireless LAN described later, or a setup screen (refer to FIG. 12), and receives a tap operation (or a touch operation) performed on the screen by the user.

Controller 506 has smartphone OS processor 506a, smartphone application processor 506b, and SSID list retainer 506c.

Smartphone OS processor 506a executes an operating system (OS) as base software of smartphone 50. Details of operation of smartphone OS processor 506a will be described later.

When an instruction to boot, terminate, or execute an application installed in smartphone 50 is input by a user operation performed on display/console 503, smartphone application processor 506b boots or terminates the application or performs a process in the application. Details of operation of smartphone application processor 506b will be described later.

SSID list retainer 506c retains an SSID as identification information of wireless router 60 in the router connection mode or master device 10 in the soft AP mode (that is, either is an access point) for smartphone 50. SSID list retainer 506c retains at least one SSID recognized by smartphone 50. That is, while one master device 10 and one wireless router 60 are illustrated in FIG. 2, master device 10 and wireless router 60 may be in plural numbers. In this case, SSID list retainer 506c retains three or more different SSIDs.

Smartphone 50 has 3G/4G protocol controller 502 and 3G/4G wireless I/F unit 501 and wirelessly connects and wirelessly communicates with mobile phone 70 connected to mobile phone network 75 or another smartphone by using the third generation (3G) or fourth generation (4G) wireless communication scheme (includes, for example, HSPA and LTE).

Smartphone 50 has audio bus 515, audio input and output controller 505, loudspeaker 513, and microphone 512 and inputs and outputs audio to an external unit.

Smartphone 50 has wireless LAN controller 507 and wireless LAN communication I/F unit 508 and sends and receives image data and audio data with master device 10, camera 30, or the like through or without passing through wireless router 60 by using the wireless LAN.

When initial setting for use of the soft AP mode described later is finished, smartphone 50 wirelessly communicates directly with master device 10 in the soft AP mode. When, for example, master device 10 receives image data transferred from camera 30 that is wirelessly connected by DECT, smartphone 50 can receive the image data transferred from master device 10. When a user operation is input on display/console 503, smartphone 50 can directly send information corresponding to the user operation to master device 10.

When initial setting for use of the router connection mode described later is finished, smartphone 50 in the router connection mode wirelessly communicates with master device 10 through wireless router 60 that uses the wireless LAN. When, for example, master device 10 receives sensor detection result data (for example, information indicating that an intruder is detected) transferred from sensor 40 that is wirelessly connected by DECT, smartphone 50 can receive the sensor detection result data transferred from master device 10. When a user operation is input on display/console 503, smartphone 50 can send information corresponding to the user operation to master device 10 through wireless router 60.

When an input operation of the user who operates smartphone 50 is provided, smartphone 50 sends a signal generated by the operation to master device 10 directly or through wireless router 60 and, furthermore, can create new setting information for sensor light 90, smart plug 80, or the like or make any change in the setting information through master device 10.

Smartphone 50 has USB communication I/F unit 511 and sends and receives data with a device, a memory, or the like having a Universal Serial Bus (USB) standard interface.

Smartphone 50 supplies power required for operation to each unit of smartphone 50 by using secondary cell 550.

Figure 8:
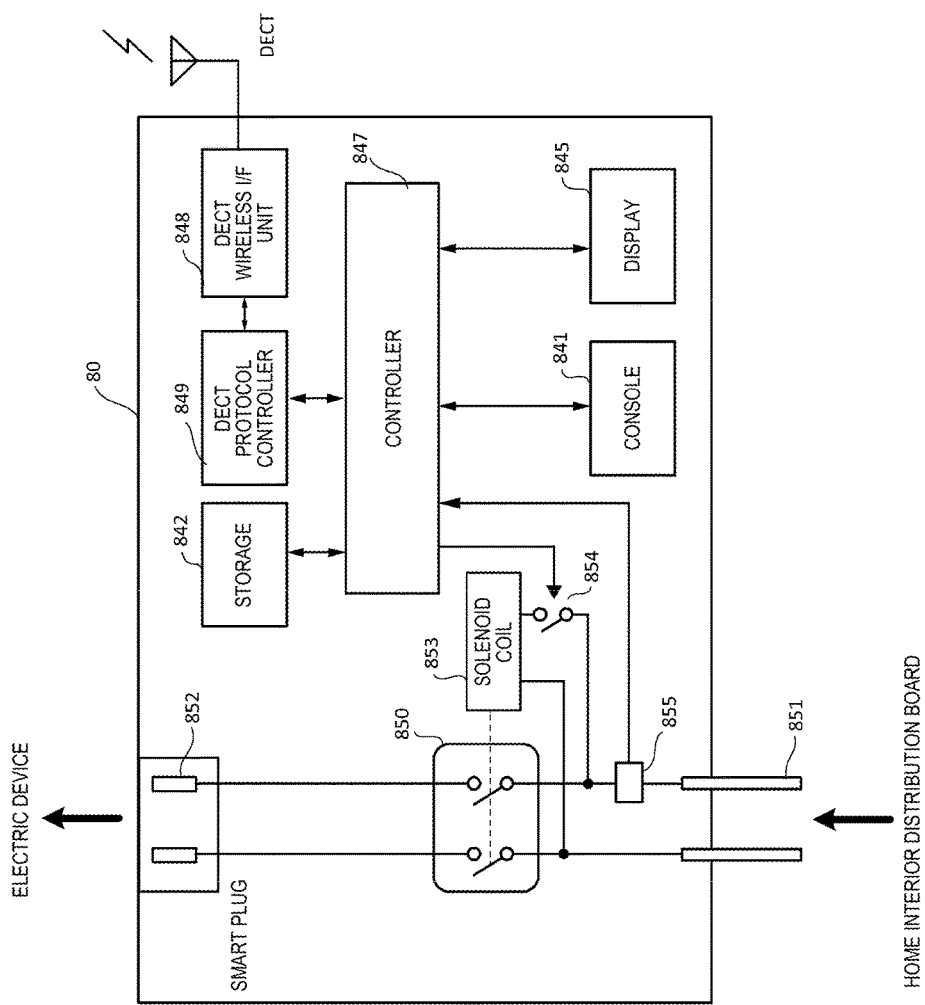
FIG. 8 is a block diagram illustrating one example of an internal configuration of a smart plug in the home interior monitoring system.

FIG. 8 is a block diagram illustrating one example of an internal configuration of smart plug 80 in home interior monitoring system 5. Smart plug 80 is configured to include at least controller 847, storage 842, and display 845 that includes a display lamp. For example, schedule setting information related to ON/OFF conditions of smart plug 80 that can be set or changed by smart plug 80 wirelessly communicating with master device 10 by using DECT is registered in storage 842.

Smart plug 80 has DECT protocol controller 849 and DECT wireless I/F unit 848, wirelessly connects and wirelessly communicates with master device 10 by using the DECT wireless communication scheme, and switches supply or blocking of a commercial alternating current power source or direct current power source to each electric device (for example, an air conditioner, a home appliance, an illumination, camera 30, and sensor 40) connected to each smart plug 80 in accordance with a signal sent through the wireless connection (that is, a switching control signal from master device 10 based on a user operation performed on smartphone 50).

Smart plug 80 has switch unit 850. Switch unit 850 connects or blocks a power supply line as a power source between outlet terminal 852 connected to an electric device and plug terminal 851 connected to an outlet terminal (not illustrated) that is present in various positions (positions such as a dining room, a living room, and a bedroom) in home interior 8 and is connected from, for example, a distribution board (not illustrated) in home interior 8. Switch unit 850 is driven by, for example, solenoid coil 853. A drive current from an alternating current power source flowing into solenoid coil 853 closes and connects switch unit 850 and provides conduction between plug terminal 851 and outlet terminal 852. Switch unit 854 switches ON/OFF of the drive current flowing into solenoid coil 853 by control of controller 847.

Current detecting element 855 is disposed between plug terminal 851 and switch unit 850. When a current flows between plug terminal 851 and outlet terminal 852, current detecting element 855 detects the current and outputs a detection signal to controller 847. When, for example, an input operation is provided from console 841, controller 847 displays the amount of power being supplied to electric devices (supplied power amount) on display 845 in the case of receiving the detection signal from current detecting element 855.

Controller 847, in the case of, for example, DECT wireless I/F unit 848 receiving an indication signal for an operating mode of smart plug 80 from master device 10 by an instruction from smartphone 50 based on a user operation, outputs a switching control signal for conduction between plug terminal 851 and outlet terminal 852 to switch unit 854. Accordingly, conduction is provided between plug terminal 851 and outlet terminal 852. Meanwhile, controller 847, in the case of, for example, DECT wireless I/F unit 848 receiving an indication signal for an operation stop mode of smart plug 80 from master device 10 by an instruction from smartphone 50 based on a user operation, outputs a switching control signal for non-conduction between plug terminal 851 and outlet terminal 852 to switch unit 854. Accordingly, non-conduction is provided between plug terminal 851 and outlet terminal 852.

Controller 847 references the schedule setting information stored in storage 842 and, when the time of the operating mode included in the schedule setting information arrives, outputs a switching control signal for conduction between plug terminal 851 and outlet terminal 852 to switch unit 854. Accordingly, conduction is provided between plug terminal 851 and outlet terminal 852. During the time of the operating mode, the state of conduction between plug terminal 851 and outlet terminal 852 is maintained, provided that, for example, DECT wireless I/F unit 848 does not receive an indication signal for the operation stop mode that is sent from master device 10 by an instruction from smartphone 50 based on a user operation.

Controller 847 references the schedule setting information stored in storage 842 and, when the time of the operation stop mode included in the schedule setting information arrives, outputs a switching control signal for non-conduction between plug terminal 851 and outlet terminal 852 to switch unit 854. Accordingly, non-conduction is provided between plug terminal 851 and outlet terminal 852. During the time of the operation stop mode, the state of non-conduction between plug terminal 851 and outlet terminal 852 is maintained, provided that, for example, DECT wireless I/F unit 848 does not receive an indication signal for the operating mode that is sent from master device 10 by an instruction from smartphone 50 based on a user operation.

Figure 9:
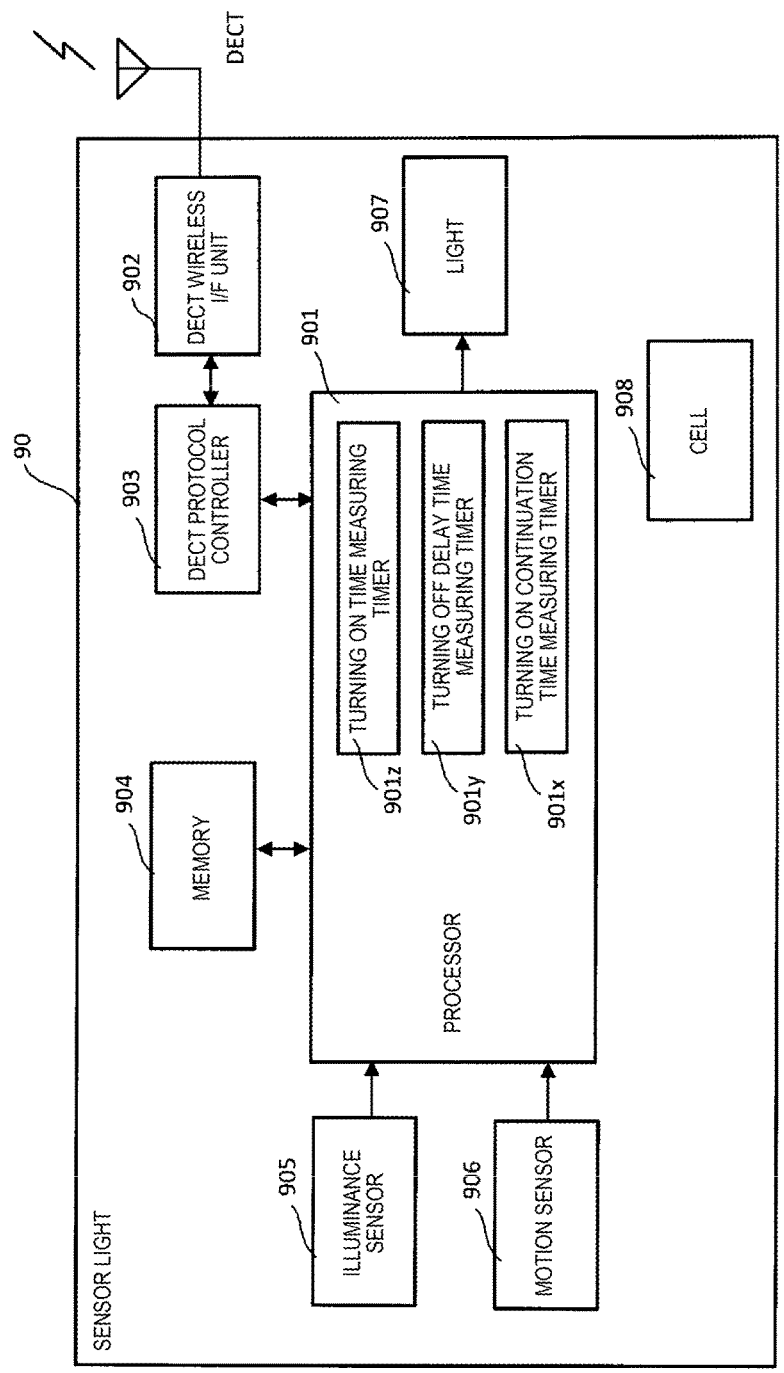
FIG. 9 is a block diagram illustrating one example of an internal configuration of a sensor light in the home interior monitoring system.

FIG. 9 is a block diagram illustrating one example of an internal configuration of sensor light 90 in home interior monitoring system 5. Sensor light 90 is configured to include processor 901, DECT wireless I/F unit 902, DECT protocol controller 903, memory 904, illuminance sensor 905, motion sensor 906, light 907, and cell 908.

Processor 901 wirelessly connects and wirelessly communicates with master device 10 by using the DECT wireless communication scheme through DECT wireless I/F unit 902 and DECT protocol controller 903. Sensor light 90 wirelessly communicates with master device 10 and thus can connect with various devices such as camera 30, sensor 40, smartphone 50, and smart plug 80.

Processor 901 incorporates turning on time measuring timer 901z, turning off delay time measuring timer 901y, and turning on continuation time measuring timer 901x.

Turning on time measuring timer 901z measures the amount of turning on time of light 907.

Turning off delay time measuring timer 901y measures the amount of turning off delay time. The turning off delay time indicates the time of continuation of the state of non-detection of a moving object from when motion sensor 906 does not detect a motion of a moving object (for example, a human being) until light 907 is turned off.

Turning on continuation time measuring timer 901x measures the amount of turning on continuation time that indicates the time of continuation of turning on from the start of turning on of light 907. An upper limit value is posed on the turning on continuation time. This upper limit value is the maximum value of the amount of turning on time in which light 907 can be continuously turned on, in view of the fact that sensor light 90 is driven by a battery (that is, cell 908). Light 907 is forced to be turned off by processor 901 in the case of being turned on up to the upper limit value. The amount of turning on time measured by turning on time measuring timer 901z can also be used as the turning on continuation time. In this case, turning on continuation time measuring timer 901x may be removed from sensor light 90.

Processor 901 forces light 907 to be turned off regardless of the status of a measured value of the turning off delay time when a measured value of the turning on continuation time of light 907 measured by turning on continuation time measuring timer 901x exceeds a set value (that is, the above upper limit value) of the turning on continuation time stored in memory 904.

Processor 901 compares the measured value of the turning off delay time measured by turning off delay time measuring timer 901y with a set value of the turning off delay time stored in memory 904 and controls turning on/turning off of light 907 according to the comparison result.

In the case of detecting the presence of a human while light 907 is turned off, processor 901 starts measuring the amount of turning on time of light 907 and starts turning on light 907.

Processor 901 turns off light 907 in the case of determining that, while light 907 is turned on, the measured value of the turning off delay time exceeds the set value of the turning off delay time and that a measured value of the turning on time of light 907 exceeds a set value of the turning on time of light 907. For example, considered is the case of the presence of a human not being detected when the set value of the turning on time of light 907 is 30 seconds, the set value of the turning off delay time is 5 seconds, and the measured value of the turning on time of light 907 is 25 seconds. In this case, if the state of non-detection of the presence of a human continues for 5 seconds from the non-detection of the presence of a human, the measured value of the turning off delay time reaches the set value of the turning off delay time (5 seconds), and the measured value of the turning on time of light 907 reaches the set value of the turning on time of light 907 (30 seconds). Thus, light 907 is turned off. In this example, light 907 is turned on for total 30 seconds.

Processor 901, while sensor light 90 is driven by cell 908 and thus can communicate with master device 10 by using the DECT wireless communication scheme, sets communication of sensor light 90 into a sleep mode (that is, a mode in which communication is not performed) except when sensor light 90 is required to wirelessly communicate with master device 10 (for example, when sensor light 90 detects the presence of a human or periodically communicates with master device 10). Accordingly, since sensor light 90 is not required to be set into a typical communication mode with master device 10, an increase in the amount of power consumption can be reduced.

The set value of the turning off delay time can be set by using, for example, two methods. In a first setting method, processor 901 stores a turning off delay time table (not illustrated) in advance in memory 904, references the turning off delay time table, and reads and acquires the set value of the turning off delay time corresponding to the set value of the turning on time of light 907.

In a second setting method, processor 901 measures the amount of turning on time of light 907, calculates a predetermined proportion of the measured value (for example, 10% of the measured value of the turning on time), and sets the calculated value as the set value of the turning off delay time. The predetermined proportion is not limited to 10% and can be set to any value such as 5% or 20%.

The set value of the turning off delay time may be set in sensor light 90 through master device 10 by input of a setting by the user who operates smartphone 50. For example, when information as to the set value of the turning off delay time input by a setting operation of the user who operates smartphone 50 is sent from smartphone 50 to master device 10, master device 10 receives the information as to the set value of the turning off delay time. Then, master device 10 sends the information as to the set value of the turning off delay time to sensor light 90. Sensor light 90, when receiving the information as to the set value of the turning off delay time, writes the information in memory 904, and thereby setting can be completed.

Also assumed is, for example, the case of continuation of the state of non-detection during the turning off delay time after a motion of a human being is finally not detected when the measured value of the turning on time exceeds 70 seconds while the set value of the turning on time of light 907 is 20 seconds. In this case, in the first setting method, if the turning off delay time table (not illustrated) is referenced, the set value of the turning off delay time is 5 seconds. Meanwhile, in the second setting method, the set value of the turning off delay time is 7 seconds which are 10% of the measured value of the turning on time until a motion of a human being is not detected. Therefore, light 907 is turned on for total 75 seconds in the first setting method, while light 907 is turned on for total 77 seconds in the second setting method. That is, in the case of setting the set value of the turning off delay time in the first setting method, the amount of time in which light 907 is turned on is decreased by 2 seconds compared with the case of setting in the second setting method, and this is preferable for battery-driven sensor light 90 from the viewpoint of a decrease in power consumption. Meanwhile, in the case of setting in the second setting method, light 907 is turned on 2 seconds longer than in the case of setting in the first setting method, and this is said to be more preferable from the viewpoint of securing a certain amount of turning on time of light 907 even if a motion of a human being is not detected.

Also assumed is, for example, the case of continuation of the state of non-detection during the turning off delay time after a motion of a human is finally not detected when the measured value of the turning on time exceeds 20 seconds while the set value of the turning on time of light 907 is 20 seconds. In this case, in the first setting method, if the turning off delay time table (not illustrated) is referenced, the set value of the turning off delay time is 5 seconds. Meanwhile, in the second setting method, the set value of the turning off delay time is 2 seconds which are 10% of the measured value of the turning on time. Therefore, light 907 is turned on for total 25 seconds in the first setting method, while light 907 is turned on for total 22 seconds in the second setting method. That is, determination as to which of the first setting method and the second setting method is to be used to set the set value of the turning off delay time depends on the length of the measured value of the turning on time of light 907 until when a motion of a human is not detected. The set value of the turning off delay time is set by using any setting method of the first setting method and the second setting method.

The first setting method/the second setting method as a method for setting the turning off delay time can be selected by an operation switch (not illustrated) incorporated in sensor light 90 or by smartphone 50 through master device 10.

Light 907 is configured of, for example, a white LED that is an illuminant, and a reflector that reflects light projected from the white LED forward. The illuminant is not limited to the white LED and may be an LED of color other than white, an incandescent lamp, a fluorescent lamp, a halogen lamp, or a xenon lamp. The present exemplary embodiment uses a white LED that consumes less power and is close to natural light.

Memory 904 stores a control program executed by processor 901 and various types of data. Various types of data include a setting information table (not illustrated), the turning off delay time table (not illustrated), and the like.

Illuminance sensor 905 as one example of a sensor senses the brightness of the surrounding area and is a photodiode that senses light in a region of a wavelength close to the wavelength of light sensed by an eye of a human being, that is, a photodiode that has a spectral sensitivity characteristic close to an eye of a human being. An image sensor may be used in illuminance sensor 905. In this case, illuminance can be acquired from the luminance value of each pixel of the image sensor, and an image can be acquired from the luminance values of all pixels.

Motion sensor 906 as one example of a sensor has an LED and a photodiode, irradiates the monitored area with near-infrared light from the LED, receives reflective light in the photodiode, and detects a motion of a human being based on a change in the reflective light. While a motion of a human being as one example of a moving object is detected, a motion of not only a human being but also an animal such as a dog or a cat or a structure such as a small or large vehicle or a robot may be detected. While irradiation uses near-infrared light, irradiation may use ultraviolet light or the like, and a motion of a moving object may be detected from a change in the reflective light. Ultrasonic wave irradiation may be used instead of light irradiation, and a motion of a moving object may be detected from a reflective wave. While motion sensor 906 detects a motion of a moving object, motion sensor 906 may be capable of detecting the presence of a moving object even if the moving object does not move, in the case of the moving object being expected to have an extremely small motion. For example, an infrared sensor (pyroelectric sensor) that is a passive infrared (PIR) sensor and, as a human sensor, senses infrared light emitted by a human body may be used as motion sensor 906. In the case of using a pyroelectric sensor, there is no light emission unlike an LED, and power is saved.

Cell 908 is, for example, four D dry cells that are used as a power source of sensor light 90. As a cell, not only a primary cell such as a manganese dry cell or an alkaline dry cell but also a rechargeable secondary cell such as a nickel-hydrogen battery, a lithium-ion cell, or a lead battery may be used. While the present exemplary embodiment uses a cell as a power source of sensor light 90, a power source device that is connected to a commercial alternating current power source and converts a commercial alternating current to output a predetermined voltage may be incorporated instead of a cell.

Operation of Home Interior Monitoring System 5

Next, operation of home interior monitoring system 5 will be described.

Hereinafter, a master device may be described as a "HUB" for convenience. Smartphone OS processor 506a of smartphone 50 may be described as a "smartphone OS" or simply an "OS", and smartphone application processor 506b of smartphone 50 may be described as a "smartphone application".

Figure 10:
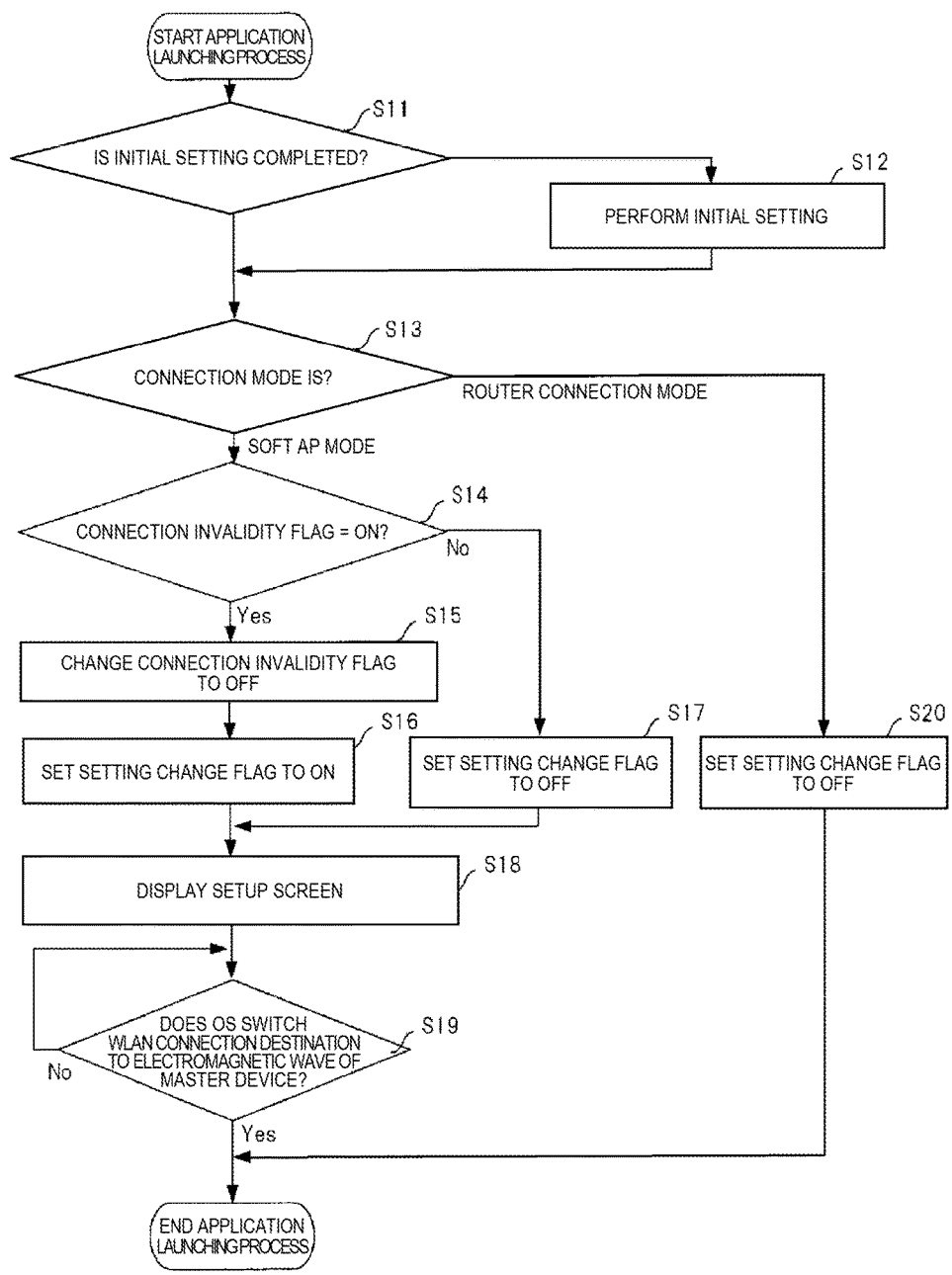
FIG. 10 is a flowchart illustrating an operating example when the smartphone launches an application.
Figure 13:
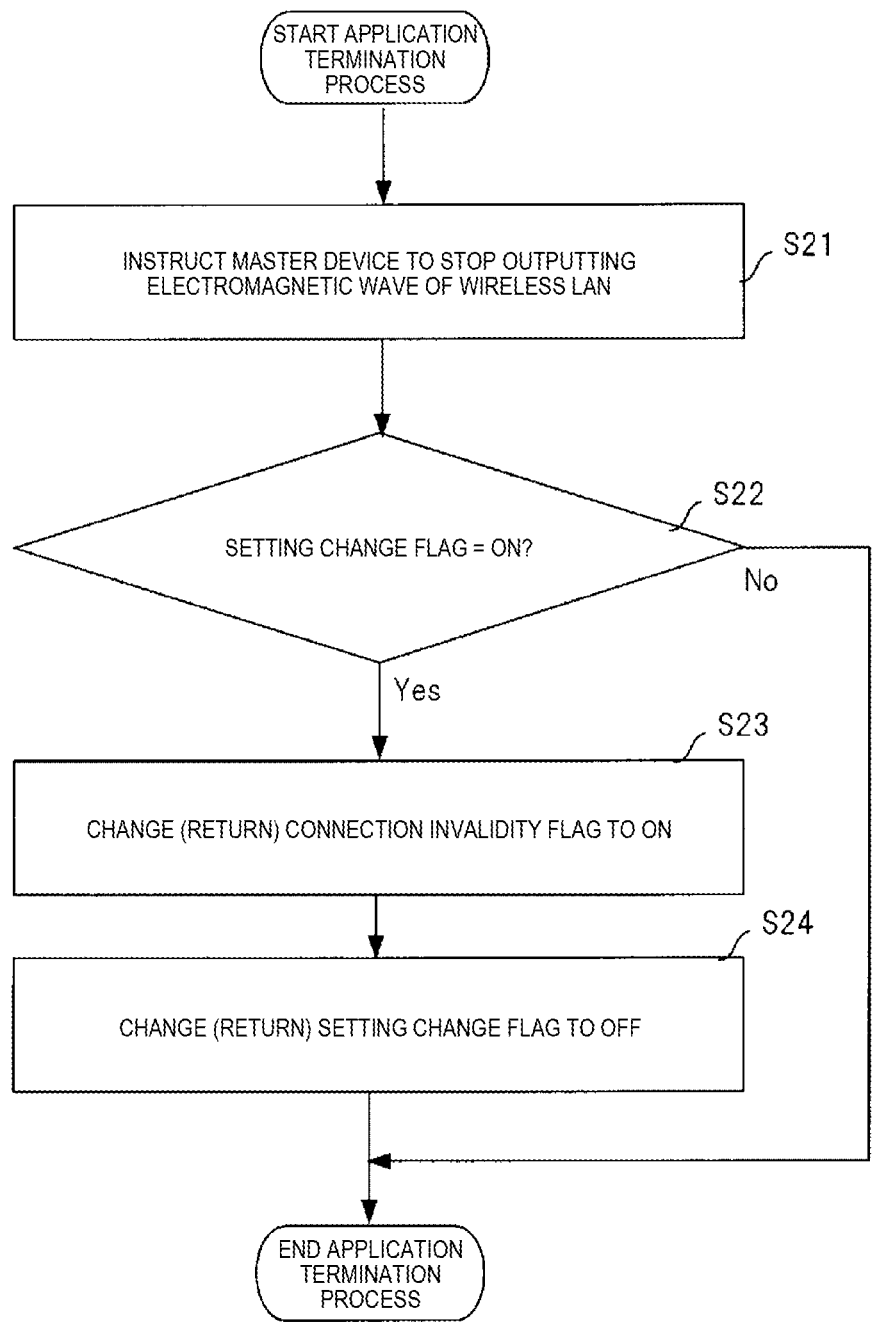
FIG. 13 is a flowchart illustrating an operating example when the smartphone terminates an application.
Figure 14:
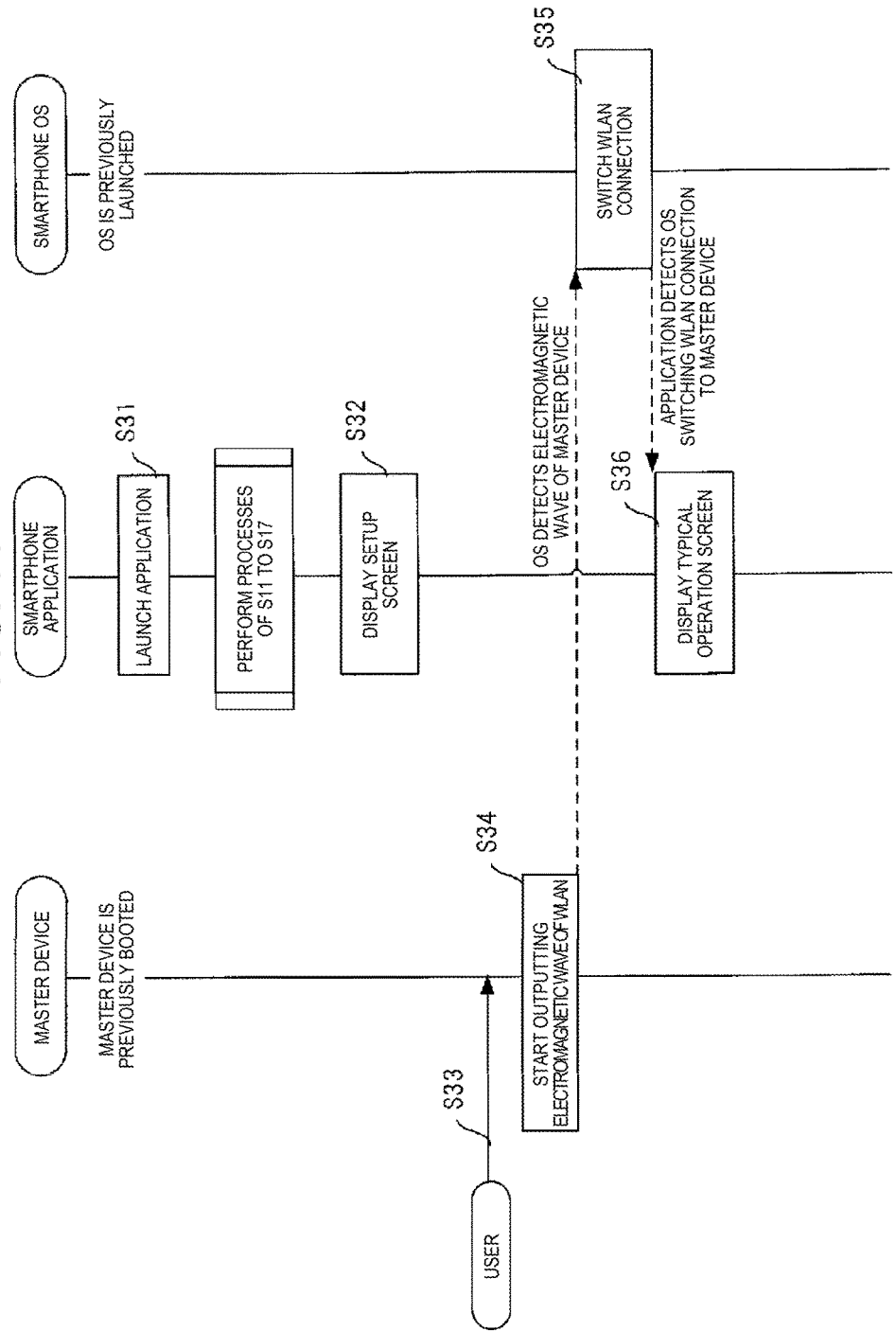
FIG. 14 is a sequence diagram illustrating an operating example when the home interior monitoring system launches an application.
Figure 15:
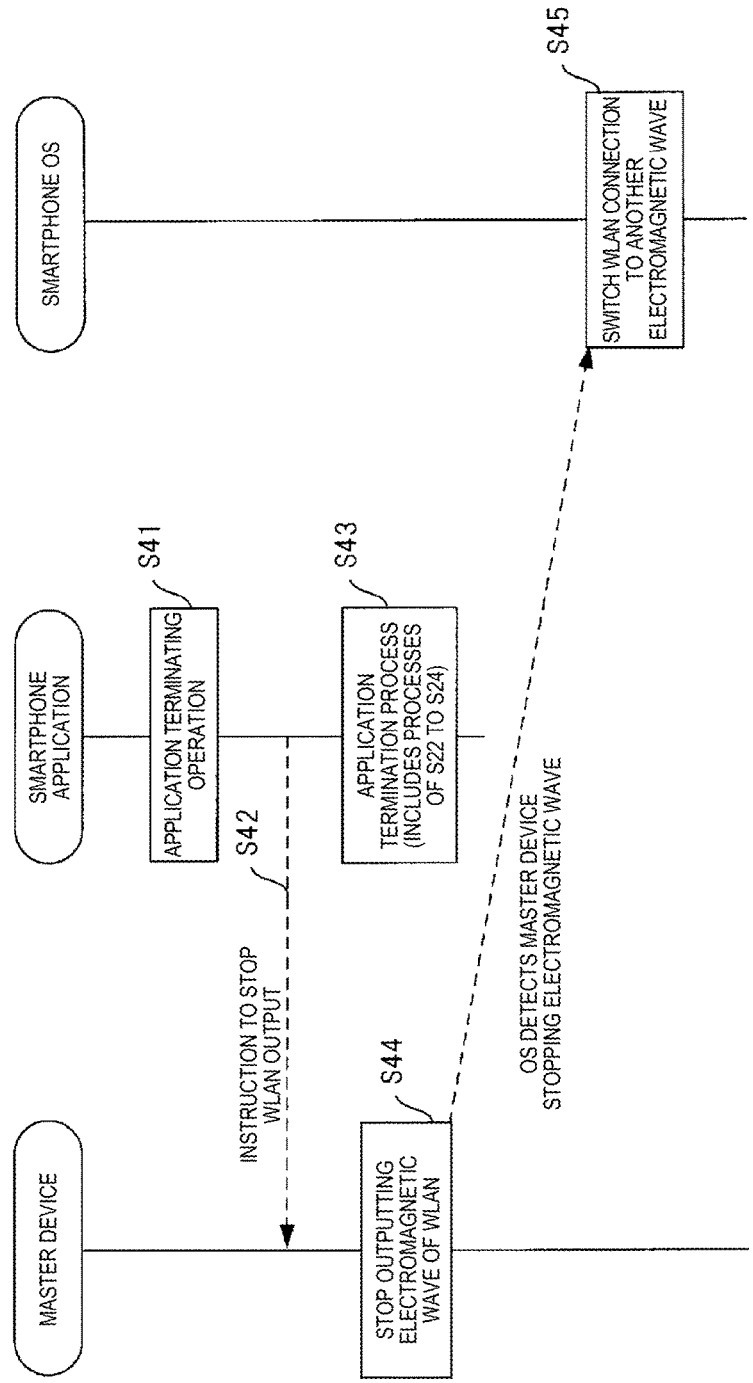
FIG. 15 is a sequence diagram illustrating an operating example when the home interior monitoring system terminates an application.

In FIG. 10 and FIG. 13, for example, smartphone 50 is considered to be selectable as a connection destination of the wireless LAN in master device 10 as an AP that is not connected to the Internet. In FIG. 14 and FIG. 15, for example, a period in which smartphone 50 is connected to master device 10 as an AP that is not connected to the Internet is considered.

FIG. 10 is a flowchart illustrating an operating example when smartphone 50 launches an application. This application is, for example, a home network application for each device of home interior monitoring system 5 to monitor the interior of the home in cooperation with each other.

First, smartphone application processor 506b determines whether or not initial setting of home interior monitoring system 5 operating in various modes is completed (S11). This initial setting includes initial setting for use of the soft AP mode or initial setting for use of the router connection mode. This initial setting includes, for example, setting of wireless setting information (includes, for example, an SSID and a password) for wireless connection between master device 10 and smartphone 50 in the soft AP mode or the router connection mode. As a result of initial setting, master device 10 and smartphone 50 shares and retains the wireless setting information and are placed in a wirelessly connectable state.

In the case of initial setting not being completed, smartphone application processor 506b performs initial setting (S12). By the process of S12, master device 10 and smartphone 50 can wirelessly connect and wirelessly communicate with each other in the soft AP mode or the router connection mode.

Smartphone application processor 506b determines whether a connection mode employed by the application is the soft AP mode or the router connection mode (S13). This connection mode is determined by, for example, initial setting, and setting information of the connection mode is retained in storage 540.

In the case of the connection mode employed by the application being the soft AP mode, smartphone application processor 506b determines whether or not a connection invalidity flag is set to ON (S14). The connection invalidity flag is a flag for using only the wireless LAN that has stable Internet connection.

Figure 11:
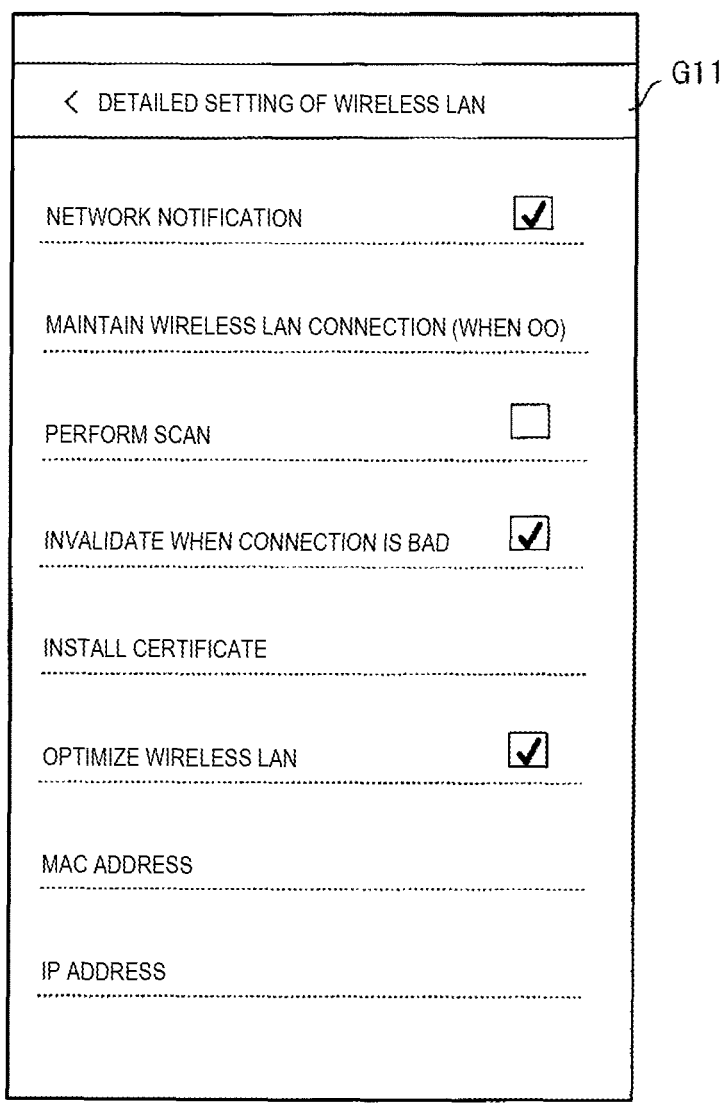
FIG. 11 is a schematic diagram illustrating a display example of a detailed setting screen for a wireless LAN.

FIG. 11 is a schematic diagram illustrating a display example of detailed setting screen G11 for the wireless LAN that includes setting related to the connection invalidity flag. In FIG. 11, the connection invalidity flag is indicated by a field "invalidate when connection is bad". That is, in the case of a check mark existing in a checkbox of the field "invalidate when connection is bad", this indicates that the connection invalidity flag is set to ON. In the case of a check mark not existing in the checkbox, this indicates that the connection invalidity flag is set to OFF. The name of the field "invalidate when connection is bad" may vary according to an OS or a model of smartphone 50.

In the case of the connection invalidity flag being set to ON, smartphone application processor 506b sets the connection invalidity flag to OFF (S15).

Smartphone application processor 506b sets a setting change flag to ON (S16). The setting change flag is a flag indicating whether or not setting of the connection invalidity flag is changed from ON to OFF. In the case of the setting change flag being ON, this indicates that setting of the connection invalidity flag is changed from ON to OFF.

Meanwhile, in the case of the connection invalidity flag being set to OFF in S14, smartphone application processor 506b sets the setting change flag to OFF (S17). In the case of the setting change flag being OFF, this indicates that setting of the connection invalidity flag is not changed from ON to OFF, that is, setting of the connection invalidity flag is OFF. In the case of the setting change flag being previously set to OFF, smartphone application processor 506b maintains this setting.

Smartphone application processor 506b displays a screen (setup screen G12) that prompts an operation to be performed on master device 10 (S18). Specifically, smartphone application processor 506b displays, on display 106, information that indicates an instruction to press the setup button of master device 10 in order to start outputting the electromagnetic wave of the wireless LAN (WLAN).

Figure 12:
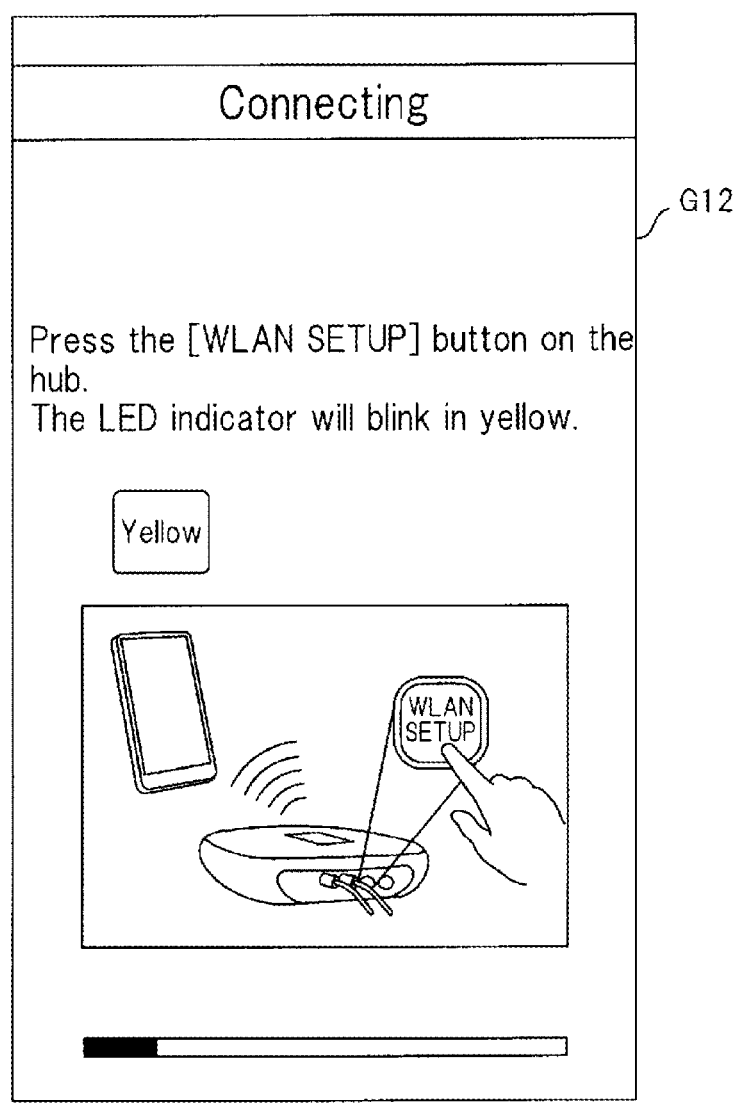
FIG. 12 is a schematic diagram illustrating a display example of a setup screen.

FIG. 12 is a schematic diagram illustrating a display example of setup screen G12. When the setup button of master device 10 is pressed in setup screen G12, master device 10 starts outputting the electromagnetic wave for wireless LAN communication with smartphone 50.

Smartphone OS processor 506a in smartphone 50 switches the connection destination of the wireless LAN to master device 10 in the case of detecting the electromagnetic wave output by master device 10.

Smartphone application processor 506b determines whether or not smartphone OS processor 506a detects the electromagnetic wave output by master device 10 and switches, to master device 10, connection of the wireless LAN to which smartphone 50 wirelessly connects (S19).

In the case of smartphone OS processor 506a determining that connection of the wireless LAN is switched to master device 10, smartphone application processor 506b finishes the process of FIG. 10 (application launching process). In the case of smartphone OS processor 506a not determining that connection of the wireless LAN is switched to master device 10, smartphone application processor 506b repeats the process of S19 until wireless LAN connection of smartphone 50 is switched.

In the case of the connection mode employed by the application being the router connection mode in S13, smartphone application processor 506b sets the setting change flag to OFF (S20). After the process of S20, smartphone application processor 506b finishes the process of FIG. 10 (application launching process).

According to the application launching process illustrated in FIG. 10, smartphone 50 sets the connection invalidity flag that is one of setting fields of the wireless LAN to OFF. Thus, even if master device 10 is an AP that cannot connect to the Internet, master device 10 can be selected as an AP of wireless LAN connection, and the wireless LAN connection can be maintained. Thus, smartphone 50 can execute the home network application and monitor the interior of the home.

FIG. 13 is a flowchart illustrating an operating example when smartphone 50 terminates an application.

First, when console 105 receives an application terminating operation, smartphone application processor 506b sends, to master device 10 through wireless LAN communication I/F 122, an instruction to stop the output of the electromagnetic wave for wireless LAN communication with smartphone 50 (S21).

By the process of S21, smartphone OS processor 506a does not detect the electromagnetic wave of master device 10 and switches the wireless connection destination to another wireless LAN network or a mobile line.

Smartphone application processor 506b determines whether or not the setting change flag is set to ON (S22).

In the case of the setting change flag being set to ON, smartphone application processor 506b sets the connection invalidity flag to ON (S23). That is, the connection invalidity flag is returned from OFF to ON. Smartphone application processor 506b sets the setting change flag to OFF (S24). That is, the setting change flag is returned from ON to OFF.

According to an application termination process illustrated in FIG. 13, smartphone 50 sets the connection invalidity flag to ON after the end of wireless connection with master device 10, and thus wireless connection to another AP that cannot connect to the Internet can be reduced. Thus, smartphone 50 can execute the home network application and monitor the interior of the home, can wirelessly connect to another AP, after the end of the application, that can connect to the Internet, can connect to the Internet, and can perform various processes (for example, browsing).

FIG. 14 is a sequence diagram illustrating an operating example when home interior monitoring system 5 launches an application. As an initial state of FIG. 14, master device 10 and the smartphone OS are assumed to be previously booted.

First, when smartphone 50 receives an application launching operation of the user through display/console 503, smartphone application processor 506b launches the application (S31).

After the process of S31, smartphone application processor 506b performs processes of S11 to S17 in FIG. 10. That is, smartphone application processor 506b performs processes (S11 to S13) related to initial setting and determination of the connection mode. In the case of the connection mode being the soft AP mode, smartphone application processor 506b performs processes related to setting of the connection invalidity flag and setting of the setting change flag (S14 to S17).

After the processes of S11 to S17 in FIG. 10, smartphone application processor 506b displays setup screen G12 (S32). Specifically, smartphone application processor 506b displays, on display 106, information that indicates an instruction to press the setup button of master device 10. The user confirms this display.

Console 105 in master device 10 receives a press of the setup button by the user (S33).

When the setup button is pressed, wireless LAN communication I/F unit 122 starts outputting the electromagnetic wave for wireless LAN communication with smartphone 50 (S34).

Smartphone OS processor 506a in smartphone 50 switches the connection destination of the wireless LAN to master device 10 when detecting the electromagnetic wave output by master device 10 (S35).

Figure 16:
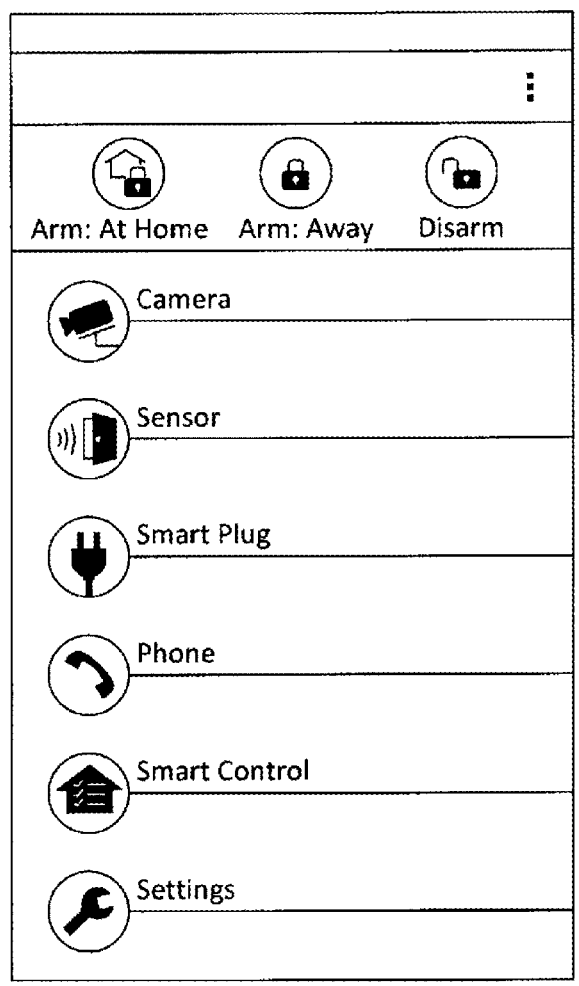
FIG. 16 is a schematic diagram illustrating a display example of a home screen related to an application.

Smartphone application processor 506b, when detecting the smartphone OS switching the wireless LAN connection to master device 10, displays a typical operation screen related to the application (for example, a home screen (refer to FIG. 16)) (S36).

According to the operation of home interior monitoring system 5 when launching the application illustrated in FIG. 14, master device 10 starts outputting the electromagnetic wave for the wireless LAN after receiving an instruction of pressing the setup button accompanied by the launch of the application. Thus, smartphone 50 can reduce unnecessary wireless LAN connection to master device 10 before launching the application. Smartphone 50 can reduce a state incapable of connecting to the Internet by reducing wireless LAN connection to master device 10. Thus, various processes that use the Internet (for example, browsing) can be performed.

FIG. 15 is a sequence diagram illustrating an operating example when home interior monitoring system 5 terminates an application (when terminating an application during operation thereof).

First, display/console 503 in smartphone 50 receives an application terminating operation from the user (S41).

Smartphone application processor 506b sends, to master device 10 in response to the application terminating operation, an instruction to stop the output of the electromagnetic wave of the wireless LAN (S42). That is, smartphone application processor 506b instructs, through wireless LAN communication I/F unit 122, master device 10 to stop outputting the electromagnetic wave for wireless LAN communication with smartphone 50.

Smartphone application processor 506b terminates the application after instructing master device 10 to stop outputting the electromagnetic wave (S43).

S43 includes the processes of S22 to S24 in FIG. 13. That is, smartphone application processor 506b determines whether or not the setting change flag is set to ON (S22). In the case of the setting change flag being set to ON, smartphone application processor 506b sets the connection invalidity flag to ON (S23). That is, the connection invalidity flag is returned from OFF to ON. Smartphone application processor 506b sets the setting change flag to OFF (S24). That is, the setting change flag is returned from ON to OFF.

Wireless LAN communication I/F unit 122 in master device 10 receives, from smartphone 50, the instruction to stop the output of the electromagnetic wave and stops outputting the electromagnetic wave for wireless LAN communication with smartphone 50 (S44).

Smartphone OS processor 506a in smartphone 50, when detecting master device 10 stopping the output of the electromagnetic wave, switches the connection destination of the wireless LAN to an electromagnetic wave other than the electromagnetic wave of master device 10 (S45).

According to the operation of home interior monitoring system 5 when terminating the application illustrated in FIG. 15, smartphone 50 switches the connection destination of the wireless LAN in the case of detecting a stoppage of the output of the electromagnetic wave of the wireless LAN accompanied by termination of the application. Thus, smartphone 50 can reduce maintaining of a state of unnecessary wireless LAN connection to master device 10 after terminating the application. Thus, smartphone 50 can reduce a state incapable of connecting to the Internet and can perform various processes that use the Internet (for example, browsing).

As above, home interior monitoring system 5 can wirelessly communicate with at least one electric device installed in the interior of the home and includes master device 10 that is not connected to Internet 65, and smartphone 50 that can wirelessly communicate directly with master device 10. Smartphone 50, in the case of launching the application, sets, to OFF, the connection invalidity flag that invalidates wireless connection to an access point not connected to Internet 65. Master device 10 outputs the electromagnetic wave for wireless connection with smartphone 50.

Accordingly, home interior monitoring system 5 can maintain wireless connection to master device 10 by setting the connection invalidity flag to OFF even if master device 10 is an AP that is not connected to the Internet. Thus, home interior monitoring system 5 can reduce the start of a search for another AP or a mobile line that can connect to the Internet, can select master device 10 as an AP of wireless LAN connection, and can maintain the wireless LAN connection. Thus, smartphone 50 can execute the application (for example, the home network application) and monitor the interior of the home.

Smartphone 50, in the case of terminating the application, may set the connection invalidity flag to ON after sending, to master device 10, an instruction to stop the output of the electromagnetic wave.

Accordingly, home interior monitoring system 5 can invalidate (forbid) wireless connection to an access point that is not connected to the Internet. Thus, a function related to the application can be realized by using master device 10 at the time of execution of the application, and after termination of the application, Internet connection can be made by selecting an access point that can be connected to the Internet.

Smartphone 50, after setting the connection invalidity flag to OFF, may display a screen that prompts a first operation to be performed for master device 10 to start outputting the electromagnetic wave. Master device 10 may receive the first operation and start outputting the electromagnetic wave for wireless connection with smartphone 50. Smartphone 50 may detect the electromagnetic wave output by master device 10 and switch the wireless connection destination to master device 10.

Accordingly, master device 10 can start outputting the electromagnetic wave after the connection invalidity flag is set to OFF. Thus, smartphone 50, in the case of detecting the electromagnetic wave of master device 10, can wirelessly connect with master device 10 that is not connected to the Internet.

Smartphone 50 may set the connection invalidity flag to ON after sending, to the master device, an instruction to stop the output of the electromagnetic wave. Master device 10 may receive the instruction to stop the output of the electromagnetic wave and may stop outputting the electromagnetic wave. Smartphone 50 may switch the wireless connection destination to another communication device after detecting a stoppage of the output of the electromagnetic wave.

Accordingly, smartphone 50, after the connection invalidity flag is set to ON, can detect master device 10 stopping the output of the electromagnetic wave. Thus, smartphone 50 can switch the wireless connection destination to an access point that can connect to the Internet, and can connect to the Internet.

Smartphone 50 may be capable of wirelessly communicating with master device 10 through wireless router 60. The connection mode for wireless connection between smartphone 50 and master device 10 may include a first connection mode for direct wireless communication with master device 10 and a second connection mode for wireless communication with master device 10 through wireless router 60. Smartphone 50 may set the connection invalidity flag to OFF in the case of the connection mode being the first connection mode.

Accordingly, smartphone 50, in the case of the connection mode existing in plural numbers, may set the connection invalidity flag to OFF in the case of wirelessly communicating in a connection mode that is not connected to the Internet (the first connection mode). Accordingly, the connection invalidity flag can be differently set according to the connection mode.

Smartphone 50, in the case of launching the application, displays a screen that prompts the first operation to be performed in order to start the output of the electromagnetic wave for wireless connection between master device 10 and smartphone 50. Master device 10 receives the first operation and starts outputting the electromagnetic wave. Smartphone 50 detects the electromagnetic wave output by master device 10 and switches the wireless connection destination to master device 10.

Accordingly, when home interior monitoring system 5 launches the application, output of the electromagnetic wave for wireless connection of master device 10 is started. Thus, smartphone 50 wirelessly connects with master device 10 when launching the application, and thus a state incapable of using the Internet can be avoided before the launch of the application. Thus, convenience of the user related to communication between master device 10 of the fixed phone and smartphone 50 can be improved without passing through wireless router 60, and the state of smartphone 50 incapable of using the Internet can be reduced.

Smartphone 50, in the case of terminating the application, terminates the application after sending, to master device 10, an instruction to stop the output of the electromagnetic wave. Master device 10 receives the instruction to stop the output of the electromagnetic wave and stops outputting the electromagnetic wave.

Accordingly, when home interior monitoring system 5 terminates the application, the output of the electromagnetic wave for wireless connection of master device 10 is stopped. When the output of the electromagnetic wave is stopped, smartphone 50 automatically switches the wireless connection destination to another communication device after detecting the stoppage of the output of the electromagnetic wave. Thus, smartphone 50 finishes wireless connection with master device 10 after termination of the application, and thus a state incapable of using the Internet can be avoided. Thus, convenience of the user related to communication between master device 10 of the fixed phone and smartphone 50 can be improved without passing through wireless router 60, and the state of smartphone 50 incapable of using the Internet can be reduced.

As described heretofore, the first exemplary embodiment is described as an example of a technology in the present disclosure. However, the technology in the present disclosure is not limited thereto and can also be applied to an exemplary embodiment to which modification, substitution, addition, omission, or the like is carried out.

In the first exemplary embodiment, home interior monitoring system 5 may combine and perform the operations at the time of launching the application illustrated in FIG. 10 and FIG. 14 or may perform the operations individually. Home interior monitoring system 5 may combine and perform the operations at the time of terminating the application illustrated in FIG. 13 and FIG. 15 or may perform the operations individually.

In the first exemplary embodiment, master device 10 may output the electromagnetic wave of the wireless LAN before smartphone 50 sets the connection invalidity flag to OFF in the operation of FIG. 10. In the operation of FIG. 13, master device 10 may output the electromagnetic wave of the wireless LAN even after smartphone 50 sets the connection invalidity flag to ON. Even in this case, smartphone 50 can realize, at an appropriate timing, wireless LAN communication using the electromagnetic wave of master device 10 that is not connected to the Internet, by switching ON and OFF of the connection invalidity flag, and can execute the application.

The present disclosure is useful for a home interior monitoring system, a communication control method, and the like that can improve convenience of a user related to communication between a master device of a fixed phone and a smartphone without passing through a wireless router and that can continue wireless connection between the smartphone and the master device.

What is claimed is:

1. A home interior monitoring system comprising:
a master device that can wirelessly communicate with at least one electric device installed in an interior of a home and is not connected to the Internet; and
a mobile phone terminal that can wirelessly communicate directly with the master device,
wherein the mobile phone terminal, when launching an application, sets, to OFF, a connection invalidity flag that invalidates wireless connection to an access point that is not connected to the Internet, and
the master device outputs an electromagnetic wave for wireless connection with the mobile phone terminal.

2. The home interior monitoring system of claim 1,
wherein the mobile phone terminal, when terminating the application, sets the connection invalidity flag to ON in a case of the connection invalidity flag being set to OFF when the application is launched.

3. The home interior monitoring system of claim 1,
wherein the mobile phone terminal, after setting the connection invalidity flag to OFF, displays a screen that prompts a first operation to be performed for the master device to start outputting the electromagnetic wave,
the master device receives the first operation and starts outputting the electromagnetic wave, and
the mobile phone terminal detects the electromagnetic wave output by the master device and switches a wireless connection destination to the master device.

4. The home interior monitoring system of claim 2,
wherein the mobile phone terminal sets the connection invalidity flag to ON after sending, to the master device, an instruction to stop the output of the electromagnetic wave,
the master device receives the instruction to stop the output of the electromagnetic wave and stops outputting the electromagnetic wave, and
the mobile phone terminal switches the wireless connection destination to another communication device after detecting a stoppage of the output of the electromagnetic wave.

5. The home interior monitoring system of claim 1,
wherein the mobile phone terminal can wirelessly communicate with the master device through a wireless router,
a connection mode for wireless connection between the mobile phone terminal and the master device includes a first connection mode for direct wireless communication with the master device and a second connection mode for wireless communication with the master device through the wireless router, and
the mobile phone terminal sets the connection invalidity flag to OFF in a case of the connection mode being the first connection mode.

6. A communication control method in a home interior monitoring system including a master device that can wirelessly communicate with at least one electric device installed in an interior of a home and is not connected to the Internet, and a mobile phone terminal that can wirelessly communicate directly with the master device, wherein the method comprises:
the mobile phone terminal, in a case of launching an application, setting, to OFF, a connection invalidity flag that invalidates wireless connection to an access point that is not connected to the Internet, and
the master device outputting an electromagnetic wave for wireless connection with the mobile phone terminal.

7. The communication control method of claim 6,
wherein the mobile phone terminal, when terminating the application, sets the connection invalidity flag to ON in a case of the connection invalidity flag being set to OFF when the application is launched.

8. The communication control method of claim 6,
wherein the mobile phone terminal, after setting the connection invalidity flag to OFF, displays a screen that prompts a first operation to be performed for the master device to start outputting the electromagnetic wave,
the master device receives the first operation and starts outputting the electromagnetic wave, and
the mobile phone terminal detects the electromagnetic wave output by the master device and switches a wireless connection destination to the master device.

9. The communication control method of claim 7,
wherein the mobile phone terminal sets the connection invalidity flag to ON after sending, to the master device, an instruction to stop the output of the electromagnetic wave,
the master device receives the instruction to stop the output of the electromagnetic wave and stops outputting the electromagnetic wave, and
the mobile phone terminal switches the wireless connection destination to another communication device after detecting a stoppage of the output of the electromagnetic wave.

10. The communication control method of claim 6,
wherein the mobile phone terminal can wirelessly communicate with the master device through a wireless router,
a connection mode for wireless connection between the mobile phone terminal and the master device includes a first connection mode for direct wireless communication with the master device and a second connection mode for wireless communication with the master device through the wireless router, and the mobile phone terminal sets the connection invalidity flag to OFF in a case of the connection mode being the first connection mode.

\* \* \* \* \*